(12) United States Patent
Butcher et al.

(10) Patent No.: US 11,650,647 B2
(45) Date of Patent: May 16, 2023

(54) SYSTEM CONTROL PROCESSOR POWER UNAVAILABILITY DATA STORAGE SYSTEM

(71) Applicant: Dell Products L.P., Round Rock, TX (US)

(72) Inventors: Andrew Butcher, Cedar Park, TX (US); Shawn Joel Dube, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/492,731

(22) Filed: Oct. 4, 2021

(65) Prior Publication Data

US 2023/0103634 A1   Apr. 6, 2023

(51) Int. Cl.
   *G06F 1/30*   (2006.01)
   *G06F 1/26*   (2006.01)

(52) U.S. Cl.
   CPC .............. *G06F 1/30* (2013.01); *G06F 1/266* (2013.01)

(58) Field of Classification Search
   CPC .................................. G06F 1/30; G06F 1/266
   USPC ................................................. 713/300, 340
   See application file for complete search history.

(56) References Cited

U.S. PATENT DOCUMENTS

| 4,323,987 | A | * | 4/1982 | Holtz | G06F 1/28 |
| | | | | | 714/E11.003 |
| 5,708,820 | A | * | 1/1998 | Park | G06F 1/32 |
| | | | | | 714/24 |
| 2006/0080515 | A1 | * | 4/2006 | Spiers | G06F 11/1456 |
| | | | | | 714/14 |
| 2018/0024964 | A1 | * | 1/2018 | Mao | G06F 9/5016 |
| | | | | | 711/173 |
| 2018/0364928 | A1 | * | 12/2018 | Park | G06F 11/14 |
| 2019/0212797 | A1 | * | 7/2019 | Karidis | G06F 11/1441 |
| 2019/0340089 | A1 | | 11/2019 | Doshi et al. | |

* cited by examiner

*Primary Examiner* — Chun Cao
(74) *Attorney, Agent, or Firm* — Joseph Mencher

(57) ABSTRACT

An SCP power unavailability data storage system includes a chassis housing a power system, a central processing system, and an SCP subsystem that are coupled together. The SCP subsystem includes a volatile SCP memory system storing data provided by the central processing system, an SCP processing system coupled to the volatile SCP memory system, and an SCP communication system that, when power is unavailable from the power system, utilizes power received via its data/power port(s) and provides that power to the volatile SCP memory system and the SCP processing system. An SCP data storage engine provided by the SCP processing system will, in response to an unavailability of power from the power system, operate using power received via the data/power port(s), retrieve data stored in the volatile SCP memory system, and transmit the data via port(s) on the SCP communication system and through a network for storage on storage device(s).

20 Claims, 23 Drawing Sheets

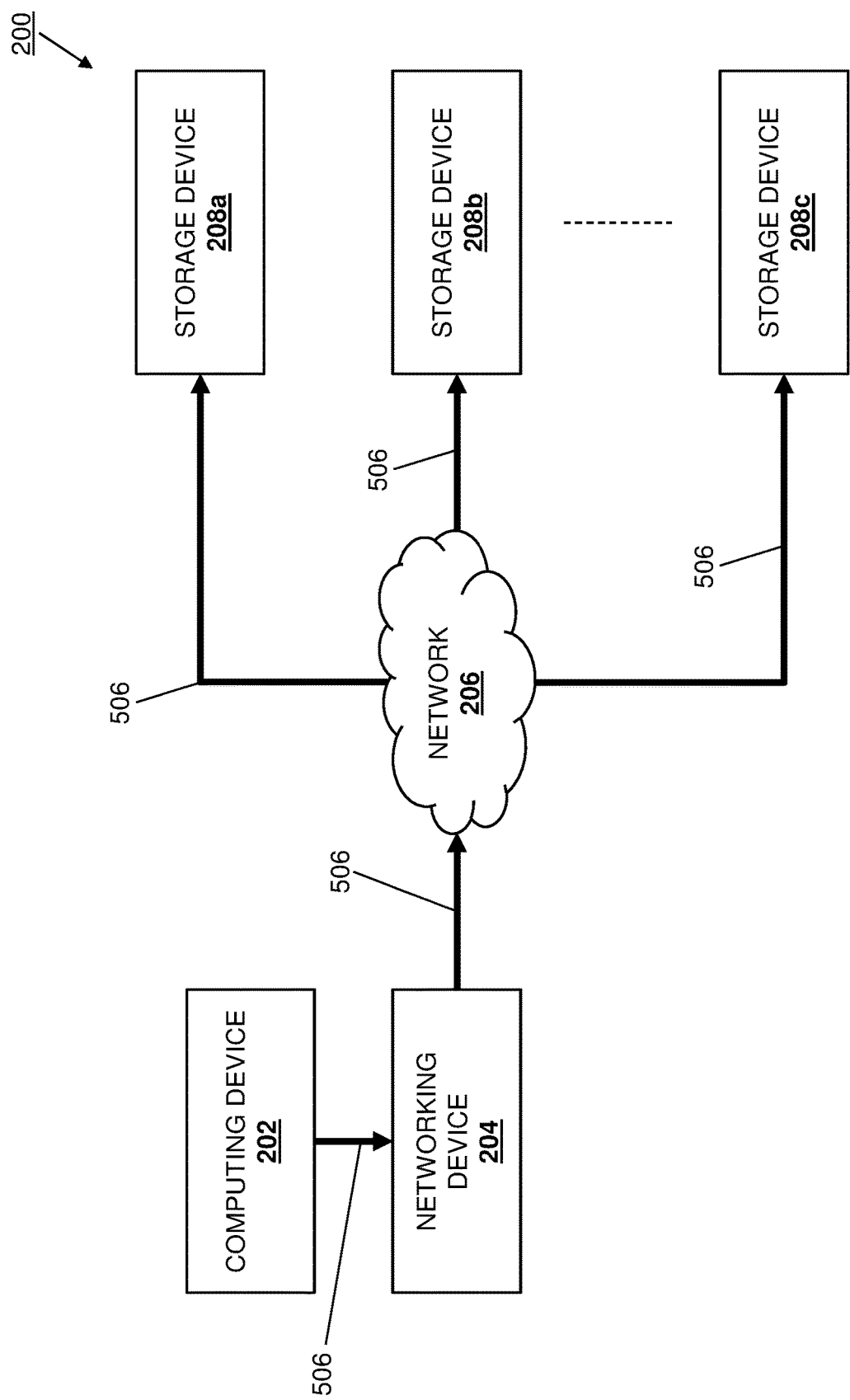

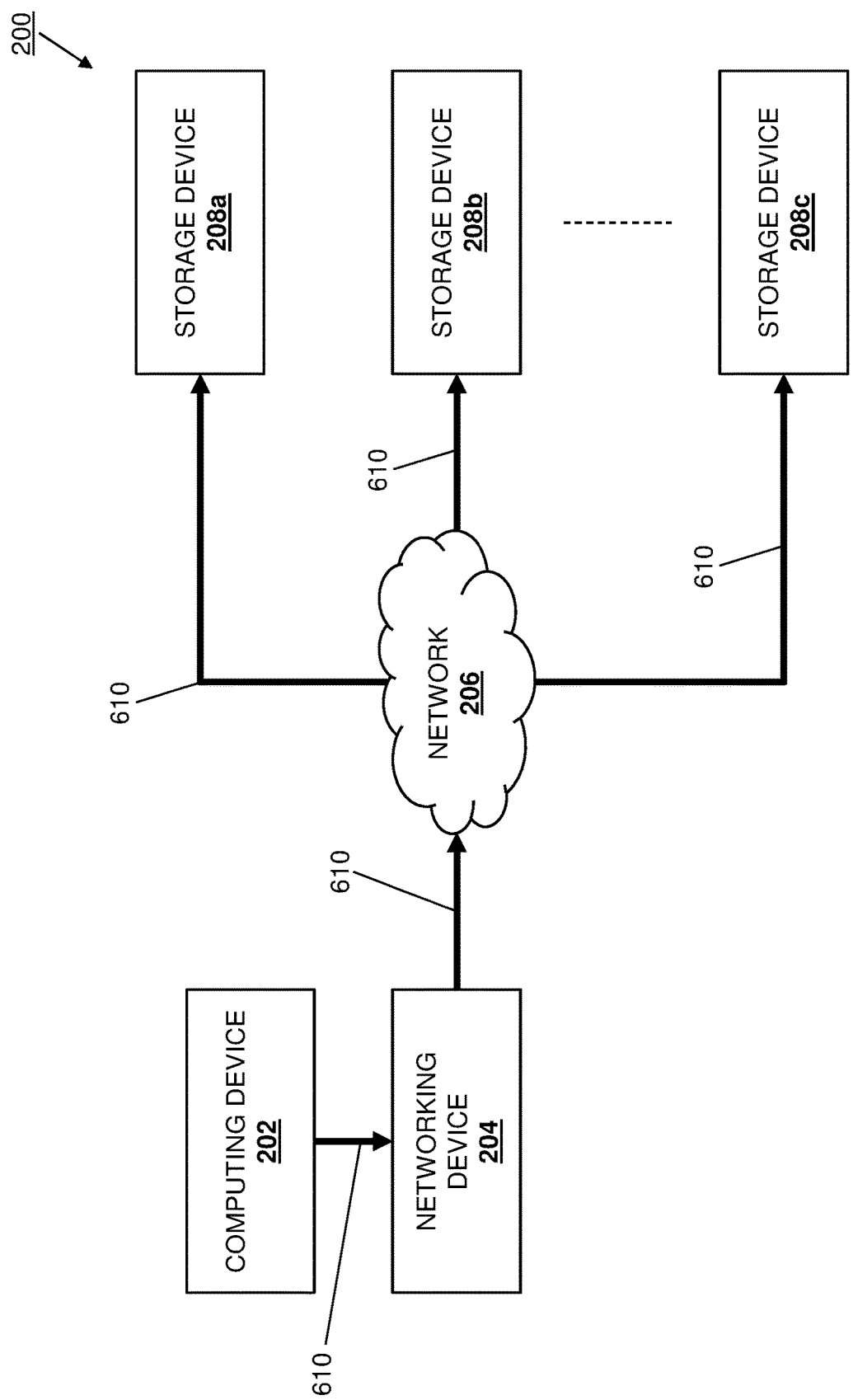

SYSTEM CONTROL PROCESSOR POWER UNAVAILABILITY DATA STORAGE SYSTEM

BACKGROUND

The present disclosure relates generally to information handling systems, and more particularly to the storage of data by a system control processor in an information handling system during a power unavailability situation.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, are often used to store data, and for "critical" data and/or other relatively important data known in the art, the ability to backup that data and/or ensure persistent storage of that data is often required. For example, server devices can be subject to power unavailability, and data stored in a volatile storage subsystem in that server device may be subject to loss if no backup/persistent storage subsystems are provided for that server device. Conventional solutions to such issues include the provisioning of backup power for the entire server device, but current and next-generation server device Central Processing Units (CPUs) (along with the memory subsystems, communication subsystems, and/or other subsystems in the server device required for data backup/persistent storage) utilize power at a level that requires such backup power subsystems to provide relatively large amount of power, which ends up increasing the cost of the server device.

Accordingly, it would be desirable to provide a power unavailability data storage system that addresses the issues discussed above.

SUMMARY

According to one embodiment, an Information Handling System (IHS) includes a System Control Processor (SCP) processing system; and an SCP memory system that is coupled to the SCP processing system and that includes instructions that, when executed by the SCP processing system, cause the SCP processing system to provide an SCP data storage engine that is configured, when power is unavailable from a power system that is coupled to the SCP processing system, to: operate using power received via at least one data/power port that is included in a plurality of ports on an SCP communication system that is coupled to the SCP processing system; retrieve data stored in a volatile portion of the SCP memory system; and transmit the data via at least one of the plurality of ports included on the SCP communication system and through a network for storage on at least one storage device.

BRIEF DESCRIPTION OF THE DRAWINGS

FIG. 5E is a schematic view illustrating an embodiment of the networked system of FIG. 2 operating during the method of FIG. 4.

FIG. 6G is a schematic view illustrating an embodiment of the networked system of FIG. 2 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
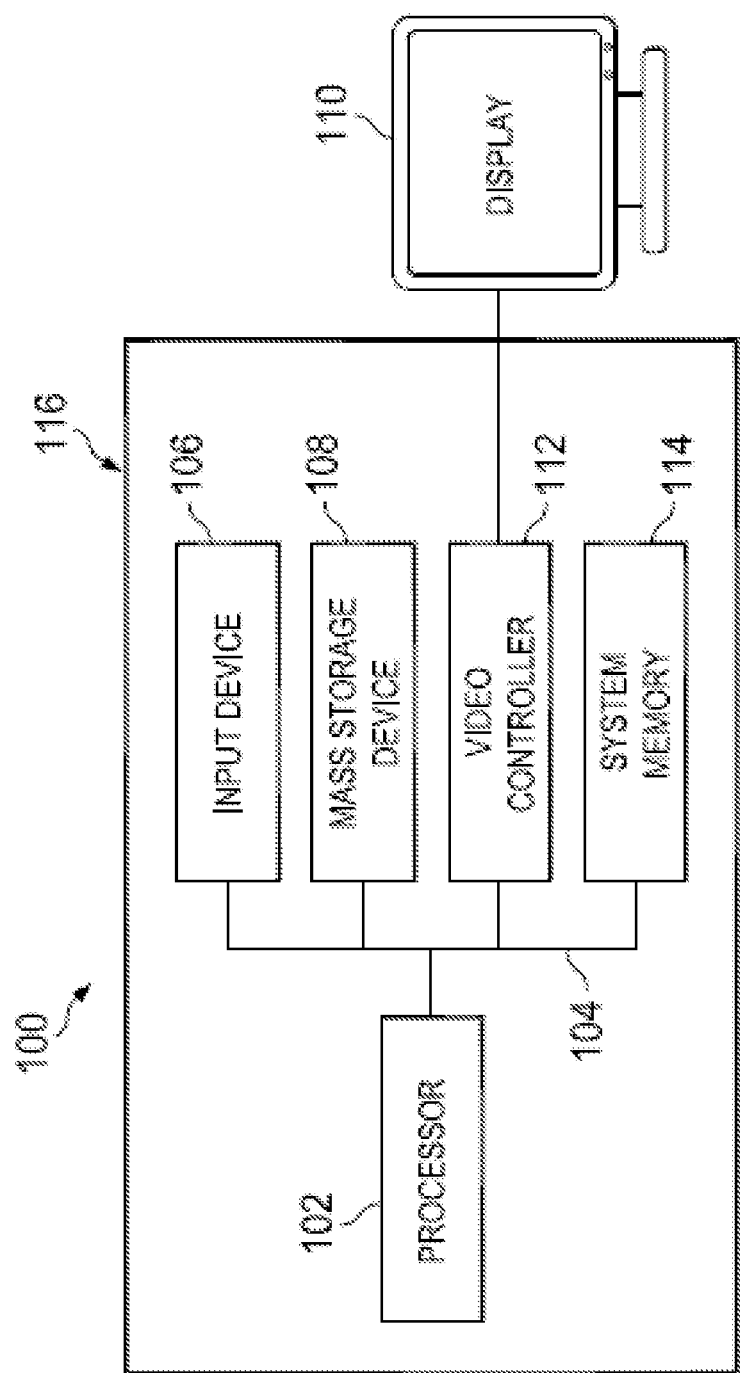
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
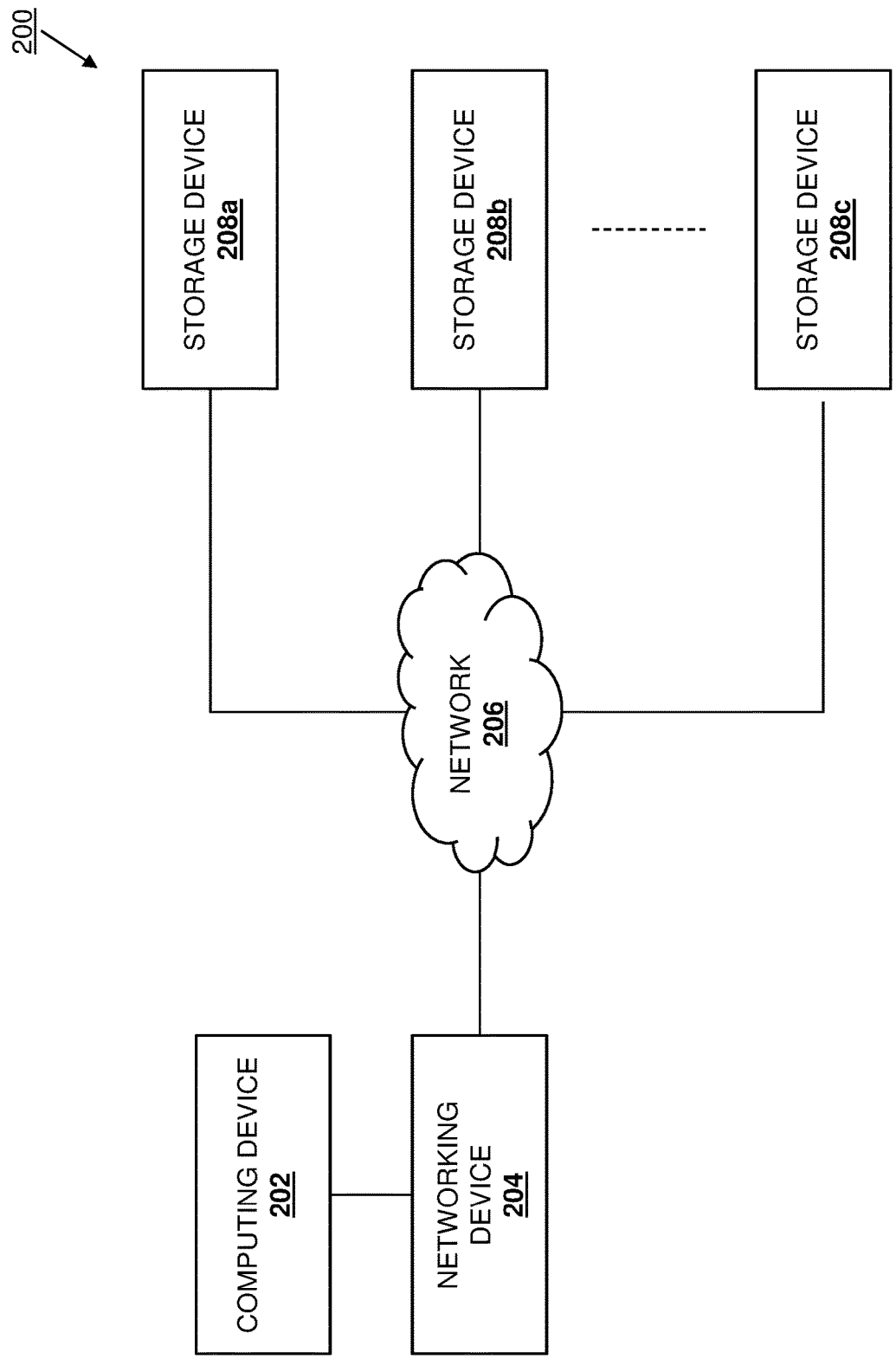
FIG. 2 is a schematic view illustrating an embodiment of a networked system that may provide the SCP power unavailability data storage system of the present disclosure.

Referring now to FIG. 2, an embodiment of a networked system 200 is illustrated that may include the System Control Processor (SCP) power unavailability data storage system of the present disclosure. In the illustrated embodiment, the networked system 200 includes a computing device 202. In an embodiment, the computing device 202 may be provided by the IHS 100 discussed above with reference to FIG. 1, and/or may include some or all of the components of the IHS 100, and in the specific examples below is described as being provided by a server device. However, while illustrated and discussed as being provided by a server device, one of skill in the art in possession of the present disclosure will recognize that computing devices provided in the networked system 200 may include any devices that may be configured to operate similarly as the computing device 202 discussed below. In the illustrated embodiments, the computing device 202 is coupled to a networking device 204 and that may be coupled to and/or otherwise part of a network 206 such as a Local Area Network (LAN), the Internet, combinations thereof, and/or any other networks that would be apparent to one of skill in the art in possession of the present disclosure.

In an embodiment, the networking device 204 may be provided by the IHS 100 discussed above with reference to FIG. 1, and/or may include some or all of the components of the IHS 100, and in the specific examples below is described as being provided by a switch device (e.g., a Top of Rack (ToR) switch device) that is configured to transmit data and power over the same data/power port and data/power cable (or multiple data/power port/cable combinations) using Power over Ethernet (PoE, PoE+, PoE++) protocols. However, while illustrated and discussed as being provided by a PoE-capable ToR switch device, one of skill in the art in possession of the present disclosure will recognize that networking devices provided in the networked system 200 may include any networking devices that may be configured to operate similarly as the networking device 202 discussed below. In the illustrated embodiments, a plurality of storage devices 208*a*, 208*b*, and up to 208*c* are coupled to the network 206, and may be provided by any of a variety of network-attached storage devices and/or storage systems that would be apparent to one of skill in the art in possession of the present disclosure. For example, the storage devices 208*a* may be included as part of a distributed storage system (e.g., a virtual Storage Area Network (vSAN) available from VMWARE® of Palo Alto, Calif., United States; a distributed storage system enabled via APACHE HADOOP opensource software, a distributed storage system enabled via POWERFLEX® available from DELL® Inc. of Round Rock, Tex., United States, etc.) for storing multiple redundant copies of data for block storage, as well as acknowledging the storage of that data. However, while a specific networked system 200 has been illustrated and described, one of skill in the art in possession of the present disclosure will recognize that the SCP power unavailability data storage system of the present disclosure may include a variety of components and component configurations while remaining within the scope of the present disclosure as well.

Figure 3:
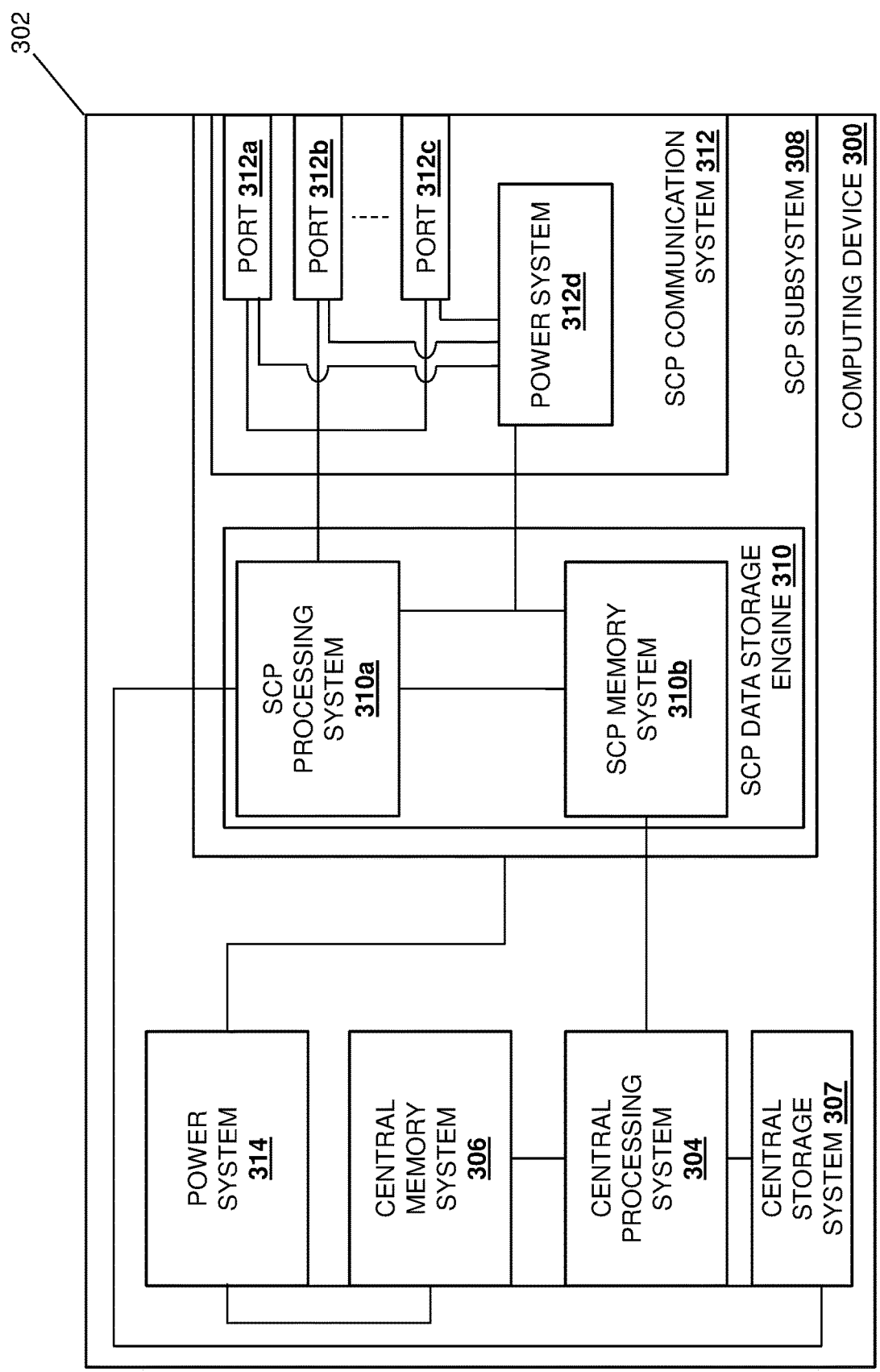
FIG. 3 is a schematic view illustrating an embodiment of a computing device that may be included in the networked system of FIG. 2, and that may provide the SCP power unavailability data storage system of the present disclosure.

Referring now to FIG. 3, an embodiment of a computing device 300 is illustrated that may provide the computing device 202 discussed above with reference to FIG. 2. As such, the computing device 300 may be provided by the IHS 100 discussed above with reference to FIG. 1 and/or may include some or all of the components of the IHS 100, and in specific examples described below is provided by a server device. However, while illustrated and discussed as being provided by a server device, one of skill in the art in possession of the present disclosure will recognize that the functionality of the computing device 300 discussed below may be provided by other devices that are configured to operate similarly as the computing device 300 discussed below. In the illustrated embodiment, the computing device 300 includes a chassis 302 that houses the components of the computing device 300, only some of which are illustrated and discussed below. For example, in the illustrated embodiments, the chassis 302 houses a central processing system 304 (e.g., a Central Processing Unit (CPU) such as the processor 102 discussed above with reference to FIG. 1) and a central memory system 306 (e.g., Dual Inline Memory Modules (DIMMs) such as the memory 114 discussed above with reference to FIG. 1) that is coupled to the central processing system 304 and that includes instructions that, when executed by the central processing system 304, cause the central processing system 304 to perform the functionality of the computing device 300 (e.g., to provide an operating system and/or application(s) that generate the data for storage discussed below). The chassis 302 may also house a central storage system 304 (Hard Disk Drives (HDDs) or Solid-State Drives (SSDs) such as the storage 108 discussed above with reference to FIG. 1) that is coupled to the central processing system 304 and that is configured to provide for persistent storage of data.

The chassis 302 may also house a System Control Processor (SCP) subsystem 308 that is coupled to the central processing system 304. In some examples, the SCP subsystem 308 may be conceptualized as an "enhanced" SmartNIC device that may be configured to perform functionality that is not available in conventional SmartNIC devices such as, for example, the data storage functionality described herein. However, while the data storage functionality of the present disclosure is illustrated and described as an enhanced SmartNIC device provided by an SCP subsystem, one of skill in the art in possession of the present disclosure will appreciated that the data storage functionality described herein may be enabled on other devices while remaining within the scope of the present disclosure as well.

In an embodiment, the SCP subsystem 308 may be provided by the IHS 100 discussed above with reference to FIG. 1 and/or may include some or all of the components of the IHS 100. In specific examples, the SCP subsystem 308 may be provided as an SCP card that is configured to connect to a slot on a motherboard in the chassis 302. In other examples, the SCP subsystem 308 may be integrated into a motherboard in the chassis 302. In yet other examples the SCP subsystem 308 may be a separate/co-motherboard circuit board that is connected to a motherboard in the chassis 302 (e.g., a two-part motherboard having a first portion that enables conventional motherboard functionality, and a second portion that enables the SCP functionality discussed below). In a specific example, the SCP subsystem 308 may be referred to as a Data Processing Unit (DPU) that may be provided by a Peripheral Component Interconnect express (PCIe) card including Advanced Reduced Instruction Set Computing (RISC) Machine (ARM) core(s) and a network interface. However, while a few specific examples are provided, one of skill in the art in possession of the present disclosure will appreciate that the SCP subsystem 308 may be provided in the computing system 300 in a variety of manners that will fall within the scope of the present disclosure.

In the illustrated example, the SCP subsystem 308 includes an SCP processing system 310a and an SCP memory system 310b that includes instructions that, when executed by the SCP processing system 310a, cause the SCP processing system 310a to provide the SCP data storage engine 310 that is configured to perform the functionality of the SCP data storage engines and SCP subsystems discussed below. In a specific example, the SCP processing system 310a may be provided by any of a variety of microcontrollers that one of skill in the art in possession of the present disclosure would recognize as being capable of performing the functionality discussed below, and the SCP memory system 310b may be a volatile memory system such as a Random Access Memory (RAM), or may include at least a portion of volatile memory. As can be seen in the specific example illustrated in FIG. 3, the SCP processing system is coupled to the central storage system 307, and the SCP memory system 310b is coupled to the central processing system 304.

In the illustrated example, the SCP subsystem 308 also includes an SCP communication system 312 that is coupled to the SCP data storage engine 310 (e.g., via a coupling between the SCP communication system 312 and the SCP processing system 310a) and that may be provided by a Network Interface Controller (NIC), wireless communication systems (e.g., BLUETOOTH®, Near Field Communication (NFC) components, WiFi components, cellular components, etc.), and/or any other communication components that would be apparent to one of skill in the art in possession of the present disclosure. As illustrated, the SCP communication system 312 may include a plurality of ports 312a, 312b, and up to 312c. In at least some of the embodiments illustrated and described below, each of the ports 312a-312c may be a data/power port (e.g., a PoE-capable port) that is configured to receive both data and power via a single data/power cable connected to that port, although embodiments in which only subsets of the ports 312a-312c are data/power ports will fall within the scope of the present disclosure as well. As such, the SCP communication system 312 includes a power system 312d (e.g., a PoE power system) that may be coupled to each of the ports 312a-312c (e.g., when each of those ports are data/power ports as discussed above), the SCP processing system 310a, and the SCP memory system 310b, and the power system 312d may be configured to receive power from the ports 312a-312c and provide at least some of that power for utilization by the SCP communication system 312, the SCP processing system 310a, and the SCP memory system 310b.

As will be appreciated by one of skill in the art in possession of the present disclosure, PoE ports and power systems may be limited in the amount of power available from each of those ports, and thus the SCP processing system 310a, the SCP memory system 310b, and the SCP communication system 312 may be selected or configured to utilize the power available from the ports 312a-312c and power system 312d in order to perform the functionality discussed below. As such, the power available from the ports 312a, 312b, and/or 312c may dictate the type of SCP processing system 310a and SCP memory system 310b utilized in the SCP subsystem 308 based on, for example, the power consumption of those components when performing the data storage functionality discussed below.

The chassis 302 may also house a power system 314 that is illustrated as coupled to the central processing system 304, the central memory system 306, the central storage system 307, the SCP subsystem 308, and/or any other components in the computing device 300. As will be appreciated by one of skill in the art in possession of the present disclosure, the power system 314 may include Power Supply Unit(s) (PSU(s)), power adapters, and/or other power components that are configured to be connected to a power source (e.g., via a wall outlet) in order to provide power from that power source to the computing device 300 to power all of the components in the computing device 300. However, while a specific computing device 300 has been illustrated and described, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the functionality discussed below, while remaining within the scope of the present disclosure as well.

Figure 4:
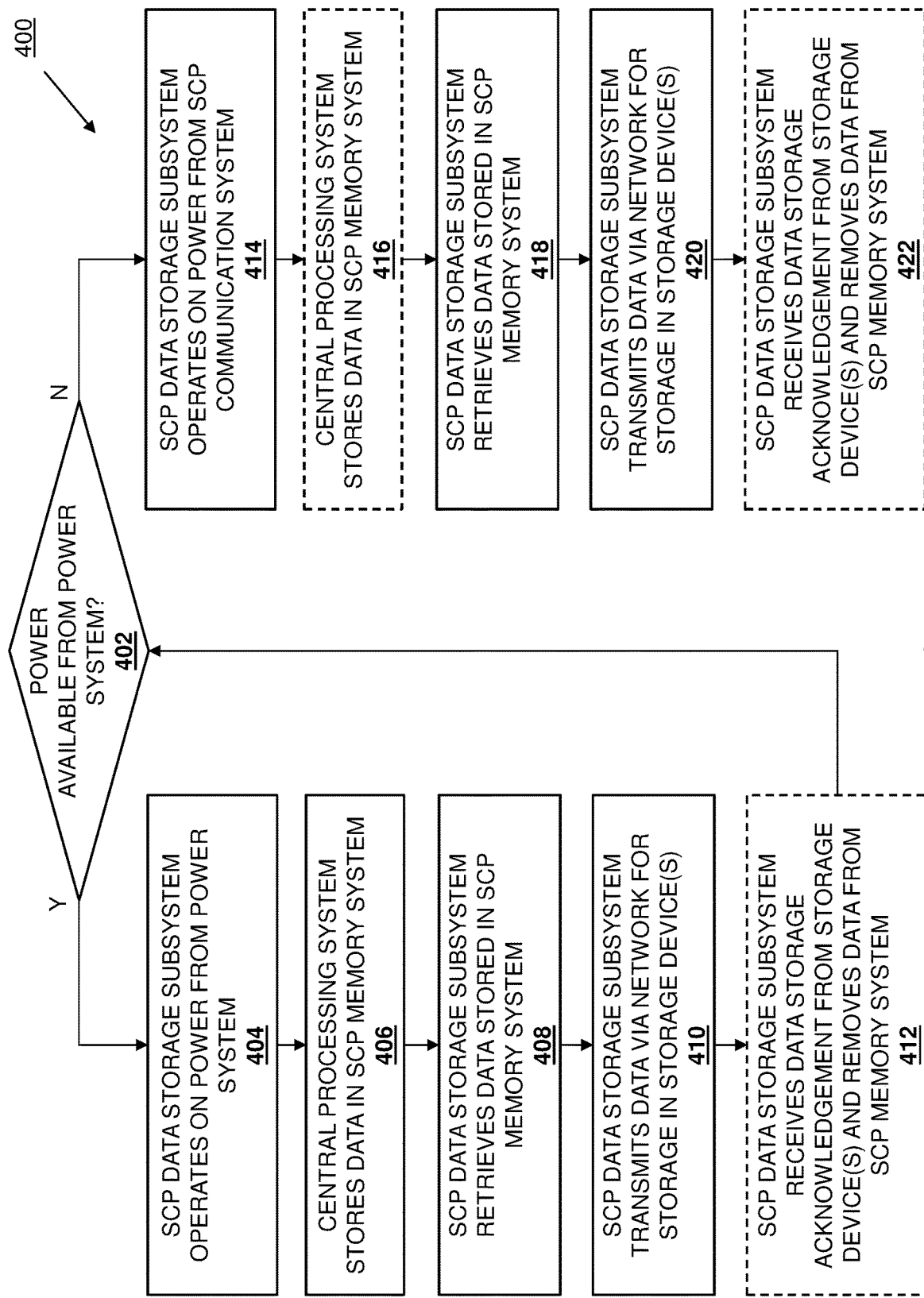
FIG. 4 is a flow chart illustrating an embodiment of a method for SCP data storage.

Referring now to FIG. 4, an embodiment of a method 400 for System Control Processor (SCP) data storage is illustrated. As discussed below, the systems and methods of the present disclosure provide an SCP subsystem in a computing device that operates to receive data from the computing device in a volatile SCP memory system and persistently store that data in one or more network-attached storage devices, and in the event of a power unavailability to the computing device, will utilize power received via one or more data/power cables connected to its SCP communication system in order to ensure that the data stored in the volatile SCP memory system is persistently stored in the network-attached storage device(s). For example, the SCP power unavailability data storage system of the present disclosure may include a chassis housing a power system, a central processing system, and an SCP subsystem that are coupled together. The SCP subsystem includes a volatile SCP memory system that stores data provided by the central processing system, an SCP processing system coupled to the volatile SCP memory system, and an SCP communication system that, when power is unavailable from the power system, utilizes power received via its data/power port(s) and provides that power to the volatile SCP memory system and the SCP processing system. An SCP data storage engine provided by the SCP processing system will, in response to an unavailability of power from the power system, operate using power received via the data/power port(s), retrieve data stored in the volatile SCP memory system, and transmit the data via port(s) on the SCP communication system and through a network for storage on storage device(s). As such, power-unavailability data backup is enabled without having to provide backup power for the entire computing device by powering an SCP subsystem in the computing device that utilizes a relatively low power amount (e.g., compared to the primary computing device subsystems) to perform the data storage/backup via existing data/power cabling, thus reducing the cost of such power-unavailability data backup systems relative to conventional systems.

The method 400 begins at decision block 402 where the method 400 proceeds depending on whether power is available from a power system. As discussed below, the computing device 202/300 may be powered using power from the power system 314 (which receives power from a power source such as a wall outlet as discussed above) to perform operations as long as that power from the power system 314/power source is available, and may be configured to perform the power-unavailability data backup operations discussed below in the event that power from the power system 314/power source becomes unavailable. As such, at decision block 402, the SCP subsystem 308 in the computing device 202/300 may be configured to monitor the power system 314 to determine whether power (or sufficient power) is available for operation of the computing device 202/300 and, in the event that power (or sufficient power) is unavailable, to automatically transition to using the "backup" power received via its SCP communication system 312 in order to perform the power-unavailability data backup operations discussed below.

Figure 5A:
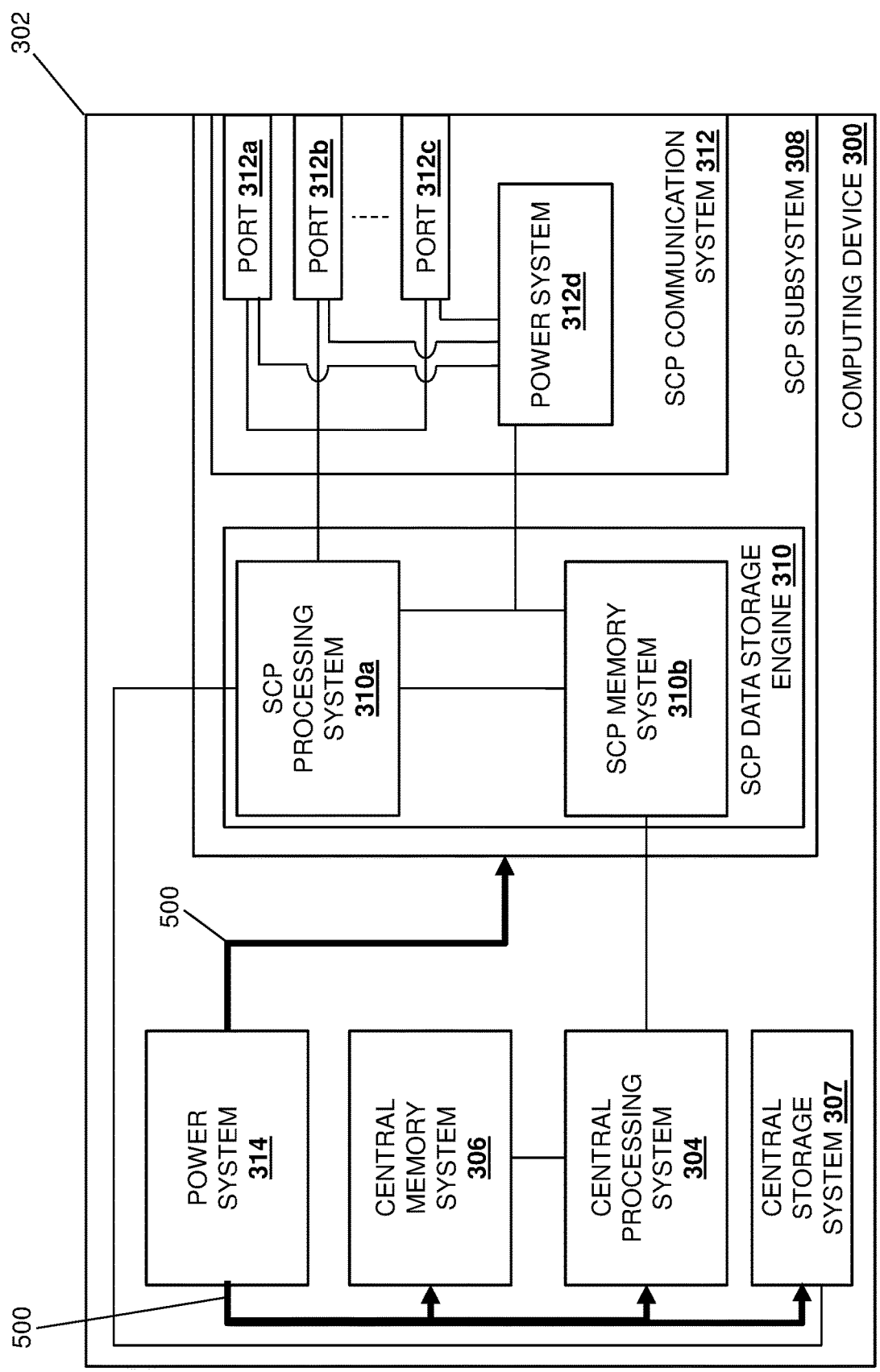
FIG. 5A is a schematic view illustrating an embodiment of the computing device of FIG. 3 operating during the method of FIG. 4.

If, at decision block 402, power is available from the power system, the method 400 proceeds to block 404 where an SCP data storage subsystem operates on power from the power system. With reference to FIG. 5A, in an embodiment of block 404 and in response to power being available from the power system 314, the power system 314 in the computing device 202/300 may perform power provisioning operations 500 that include providing power received via a power source (e.g., a wall outlet) to the central processing system 304, the central memory system 306, the central storage system 308, the SCP subsystem 308, and/or any other components of the computing device 202/300. As will be appreciated by one of skill in the art in possession of the present disclosure, FIG. 5A illustrates "normal" power availability operations for the computing device 202/300 in which all power needed by the computing device 202/300 and its components is available via the power system 314, and that the power system 314 may then provide that power to the components of the computing device 202/300 using any of a variety of techniques known in the art. As such, while blocks 406-412 describe power available data storage operations by the computing device 202/300 when power is available from the power system 314, the computing device 202/300 and/or its components may perform a variety of other operations using power available from the power system 314 while remaining within the scope of the present disclosure as well.

Figure 5B:
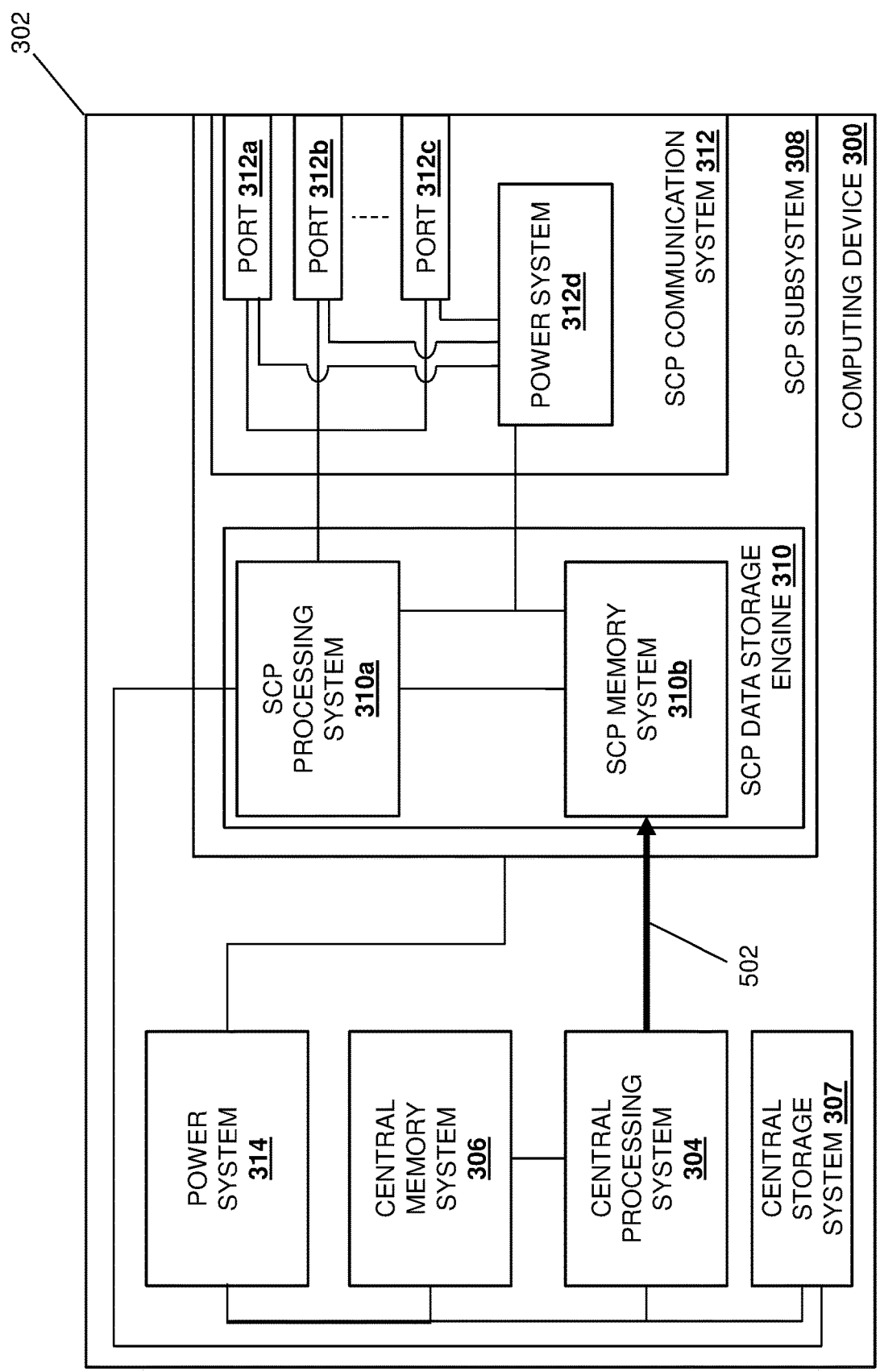
FIG. 5B is a schematic view illustrating an embodiment of the computing device of FIG. 3 operating during the method of FIG. 4.

The method 400 then proceeds to block 406 where a central processing system stores data in an SCP memory system. With reference to FIG. 5B, in an embodiment of block 406 and while power is available from the power system 314 as illustrated in FIG. 5A, the central processing system 304 in the computing device 202/300 may perform data storage operations 502 that include storing data in the volatile SCP memory system 310b included in the SCP subsystem 308. While illustrated as directly storing data in the volatile SCP memory system 310b, one of skill in the art in possession of the present disclosure will appreciate that the central processing system 304 in the computing device 202/300 may provide that data to the SCP processing system 310a for storage in the SCP memory system 310b at block 406 while remaining within the scope of the present disclosure as well. As will be appreciated by one of skill in the art in possession of the present disclosure, the central memory system 306 may include instructions that, when executed by the central processing system 304, cause the central processing system 304 to provide an operating system, applications, and/or any of a variety of other data generation subsystems that are configured to provide data for storage in the volatile SCP memory system 310b in the SCP subsystem 308 as part of the data storage operations 502.

For example, the data storage operations 502 may include the central processing system 304 in the computing device 202/300 storing the data in the volatile SCP memory system 310b (e.g., a RAM or other volatile memory system) or a volatile portion of the SCP memory system 310b, and the SCP data storage engine 310 may be configured to then provide for persistent storage of that data as discussed below (e.g., the SCP subsystem 308 may operate to relieve the central processing system 304 from performing processing operations needed to store that data on the storage device(s) 208a-208c via the network). In a specific example, a data storage configuration for the computing device 202/300 may provide for primary data storage and/or redundant data storage in the storage device(s) 208a-208c connected to the computing device 202/300 via the network 206 (including the networking device 204), and thus the data storage operations 502 may provide for a first data storage sub-operation that stores data in volatile RAM in the SCP subsystem 308, followed by a second data storage sub-operation that stores that data in non-volatile network-attached storage devices when the SCP subsystem 308 is available to perform those persistent data storage operations (discussed in further detail below). As such, the data stored by the central processing system 304 in the computing device 202/300 as part of the data storage operations 502 may reside in the volatile SCP memory system 310a for some period of time before being persistently stored in the storage device(s) 208a-208c via the network 206, which one of skill in the art in possession of the present disclosure will recognize presents no issues as long as the power system 314 continues to perform the power provisioning operations 500 discussed above with reference to FIG. 5A such that the volatile SCP memory system 310b receives power needed to maintain the storage of that data.

Figure 5C:
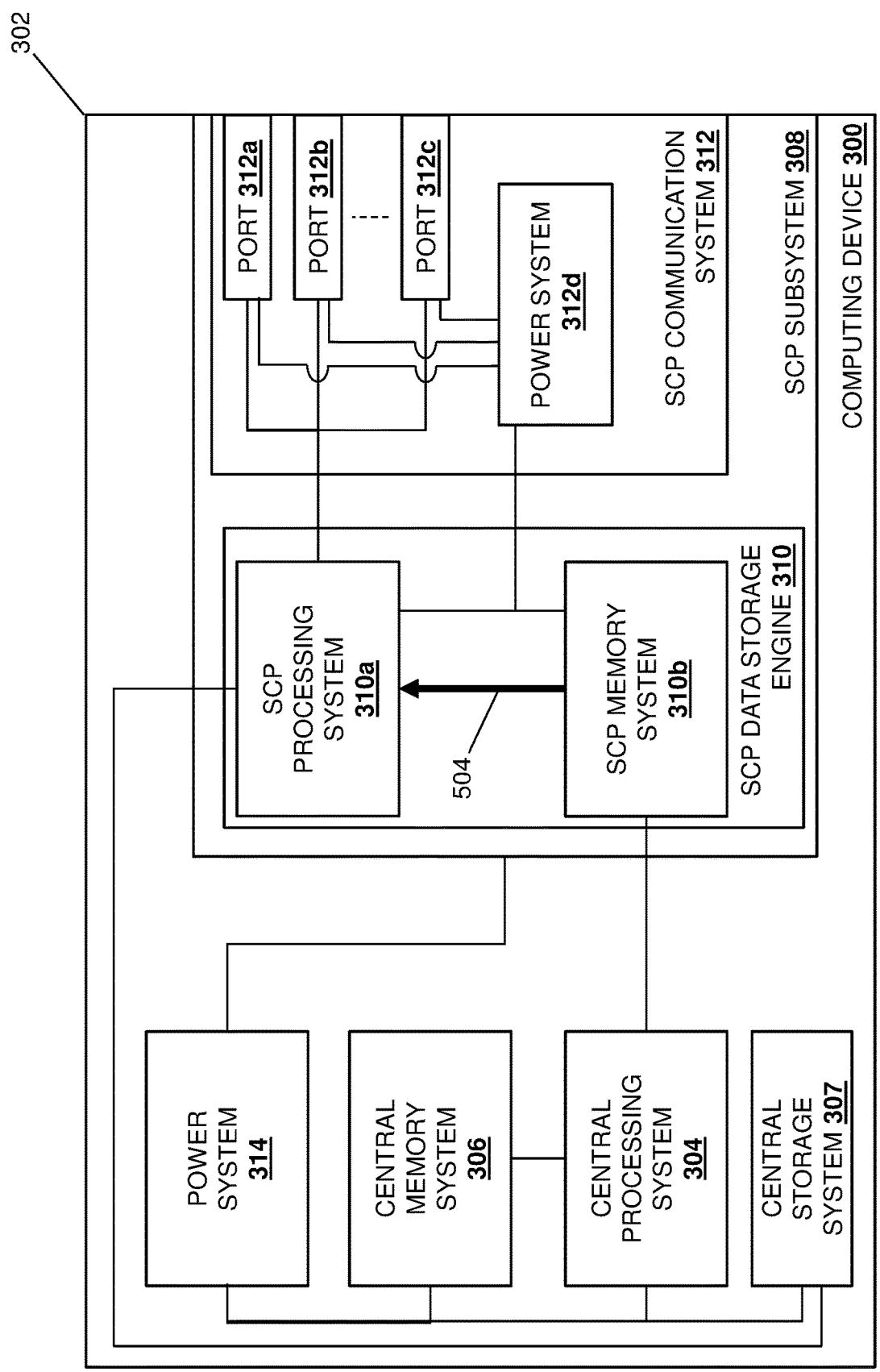
FIG. 5C is a schematic view illustrating an embodiment of the computing device of FIG. 3 operating during the method of FIG. 4.

The method 400 then proceeds to block 408 where the SCP data storage subsystem retrieves data stored in the SCP memory system. With reference to FIG. 5C, in an embodiment of block 408, the SCP processing system 310a providing the SCP data storage engine 310 in the computing device 202/300 may perform data retrieval operations 504 that include retrieving data stored in the volatile SCP memory system 310b. As will be appreciated by one of skill in the art in possession of the present disclosure, the SCP processing system 310a may perform a variety of processing tasks for the SCP subsystem 308 (which may provide for the performance of a variety of tasks for the computing device 202/300), and thus the data retrieval operations 504 may be performed by the SCP processing system 310a at block 408 some time period after that data was stored in the volatile SCP memory system 310b as part of the data storage operations 502 performed by the central processing system 304 at block 406, which as discussed above presents no issues as long as the power system 314 continues to perform the power provisioning operations 500 discussed above with reference to FIG. 5A such that the volatile SCP memory system 310b receives power needed to maintain the storage of that data.

Figure 5D:
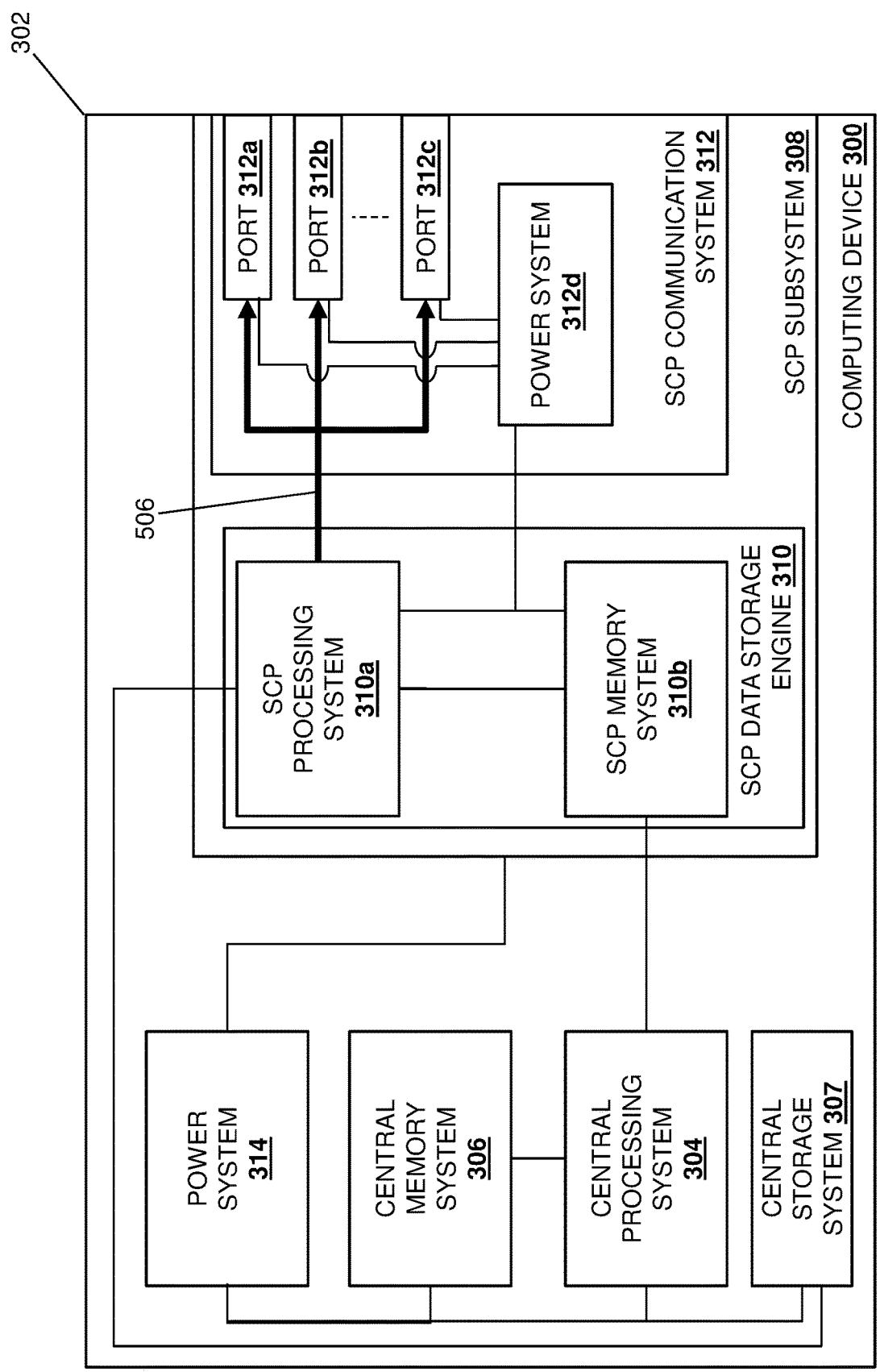
FIG. 5D is a schematic view illustrating an embodiment of the computing device of FIG. 3 operating during the method of FIG. 4.

The method 400 then proceeds to block 410 where the SCP data storage subsystem transmits the data via a network for storage in storage device(s). With reference to FIGS. 5D and 5E, in an embodiment of block 410, the SCP processing system 310a providing the SCP data storage engine 310 in the computing device 202/300 may perform data storage operations 506 that include transmitting the data retrieved from the volatile SCP memory system 310b via one or more of the ports 312a-312c, through the networking device 204, via the network 206, and to one or more of the storage devices 208a-208c. Thus, while FIGS. 5D and 5E illustrate the data being transmitted via each of the ports 312a-312c and to each of the storage devices 208a-208c as part of the data storage operations 506, one of skill in the art in possession of the present disclosure will appreciate how data may be transmitted via a subset of the ports 312a-312c (e.g., a single port) and to a subset of the storage devices 208a-208c (e.g., a single storage device) while remaining within the scope of the present disclosure as well. As discussed above, the SCP processing system 310a may perform a variety of processing tasks for the SCP subsystem 308 (which may provide for the performance of a variety of tasks for the computing device 202/300), and thus the data storage operations 506 may be performed by the SCP processing system 310a at block 410 some time period after that data was stored in the volatile SCP memory system 310b as part of the data storage operations 502 performed by the central processing system 304 at block 406, which as discussed above presents no issues as long as the power system 314 continues to perform the power provisioning operations 500 discussed above with reference to FIG. 5A such that the volatile SCP memory system 310b receives power needed to maintain the storage of that data.

Figure 5F:
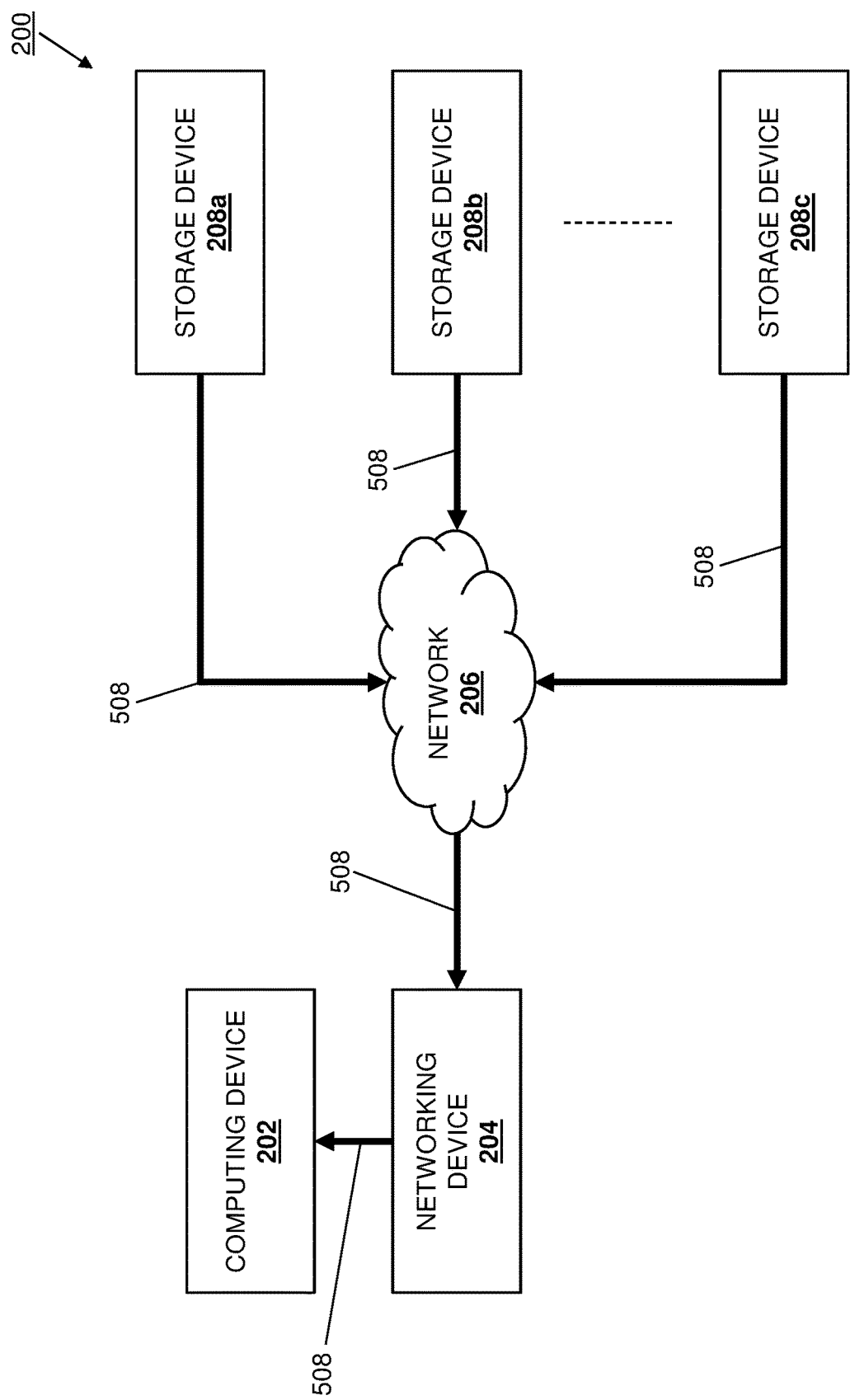
FIG. 5F is a schematic view illustrating an embodiment of the networked system of FIG. 2 operating during the method of FIG. 4.
Figure 5G:
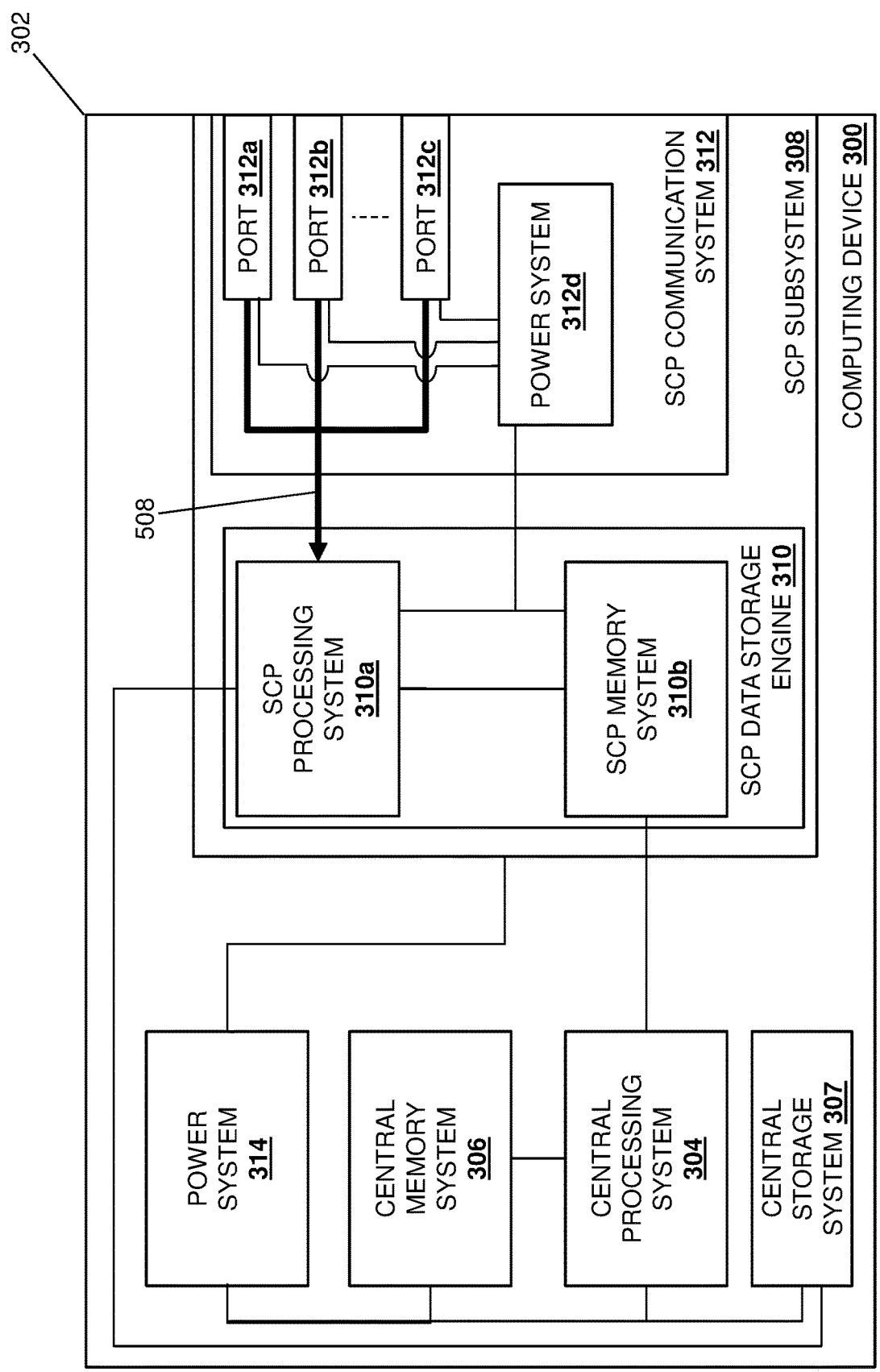
FIG. 5G is a schematic view illustrating an embodiment of the computing device of FIG. 3 operating during the method of FIG. 4.

The method 400 may then proceed to optional block 412 where the SCP data storage subsystem receives a data storage acknowledgement from the storage device(s) and removes the data from the SCP memory system. With reference to FIGS. 5F and 5G, in an embodiment of optional block 412 and in response to receiving the data as part of the data storage operations 506 and storing that data, one or more of the storage device(s) 208a-208c may perform data storage acknowledgement operations 508 that include generating a data storage acknowledgement and transmitting that data storage acknowledgement via the network 206, through the networking device 204, and to the computing device 202/300 such that the SCP processing system 310a providing the SCP data storage engine 310 receives the data storage acknowledgement via one or more of the ports 312a-312c. Thus, while FIGS. 5F and 5G illustrate the data storage acknowledgement being transmitted by each of the storage devices 208a-208c as part of the data storage acknowledgement operations 508 and received by the SCP processing system 310a via each of the ports 312a-312c, one of skill in the art in possession of the present disclosure will appreciate how data storage acknowledgements may be transmitted by a subset of the storage devices 208a-208c (e.g., a single storage device) and received by the SCP processing system 310a via a subset of the ports 312a-312c (e.g., a single port) while remaining within the scope of the present disclosure as well.

Figure 5H:
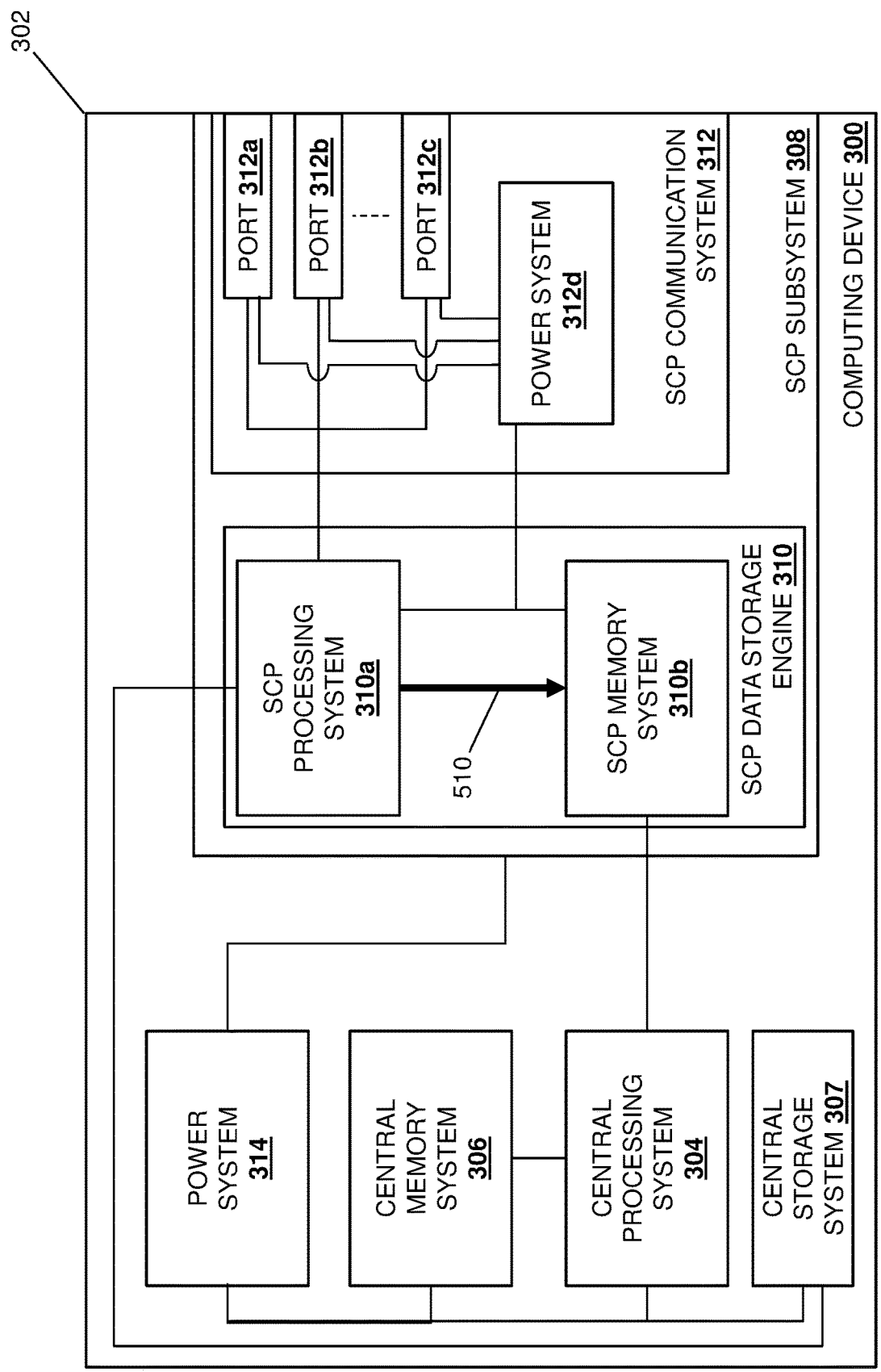
FIG. 5H is a schematic view illustrating an embodiment of the computing device of FIG. 3 operating during the method of FIG. 4.

With reference to FIG. 5H, in an embodiment of optional block 412 and in response to receiving the data storage acknowledgement from the storage device(s) 208a-208c, the SCP processing system 310a providing the SCP data storage engine 310 may perform data removal operations 510 that include removing the data from the volatile SCP memory system 310b. As will be appreciated by one of skill in the art in possession of the present disclosure, the data storage acknowledgment received from the storage device(s) 208a-208c verifies that the data transmitted as part of the data storage operations 506 has been persistently stored in the storage device(s) 208a-208c, and thus allows that data to be erased, deleted, and/or otherwise removed from the volatile SCP memory system 310b without any associated risk of loss of that data if power becomes unavailable to the volatile SCP memory system 310b. The method 400 may then return to decision block 402. As such, the method 400 may loop such that, as long as power is available from the power system 314 to the SCP subsystem 308, the central processing system 304 stores data in the volatile SCP memory system 310b, the SCP processing system 310a retrieves that data from the SCP memory system 310b and transmits that data via the network 206 for storage in the storage device(s) 208a-208c, and the SCP processing system 310a optionally removes that data from the SCP memory system 310b when a data storage acknowledgment from the storage device(s) 208a-208c.

Figure 6A:
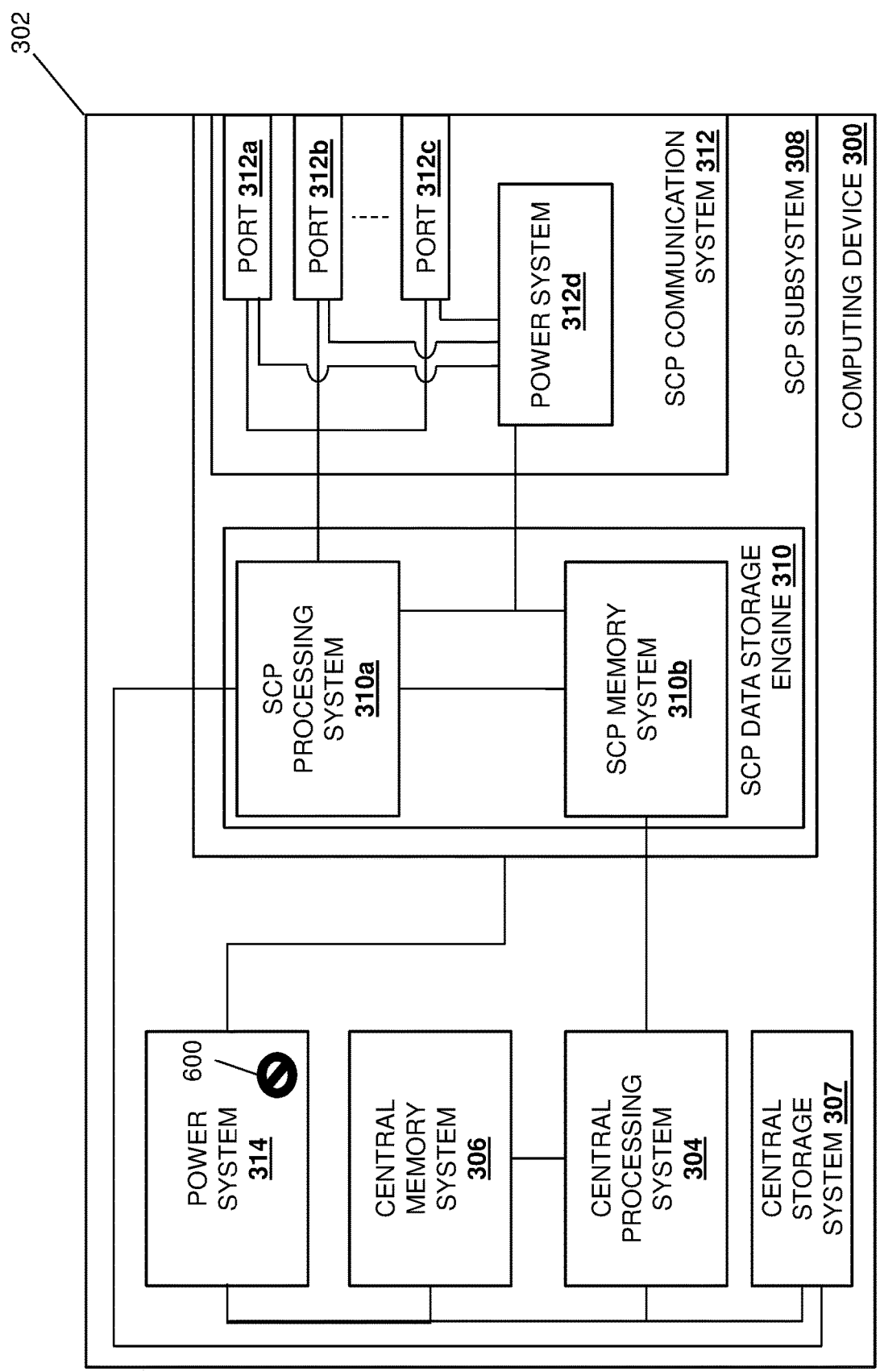
FIG. 6A is a schematic view illustrating an embodiment of the computing device of FIG. 3 operating during the method of FIG. 4.

If at block 402 power is not available from the power system, the method 400 proceeds to block 414 where the SCP data storage subsystem operates on power from an SCP communication system. With reference to FIG. 6A, power from the power system 314 in the computing device 202/300 may become unavailable (as illustrated by element 600 in FIG. 6A) due to, for example, power unavailability from the power source (e.g., via a wall outlet connected to the power system 314), a failure or other unavailability of the power system 314 or components in the power system 314, and/or due to any other power unavailability situations that would be apparent to one of skill in the art in possession of the present disclosure. As discussed above, in response to power from the power system 314 in the computing device 202/300 becoming unavailable, the SCP subsystem 308 may be configured to utilize power provided by the networking device 204 via one or more data/power cables that are connected to the port(s) 312a-312c in the SCP communication system 312.

In a specific example, the networking device 204 may be a PoE-capable switch device that is connected by respective Ethernet cable(s) to respective port(s) 312a-312c in the SCP communication system 312, and one of skill in the art in possession of the present disclosure will appreciate how, prior to block 414, the SCP communication system 312 and the networking device 204 may have performed PoE negotiation operations to negotiate a power amount that will be provided by the networking device 204 to any port(s) 312a-312c via respective Ethernet cable(s). As such, prior to the power becoming unavailable from the power system 314, the networking device 204 may have been configured to provide (and one or more of the port(s) 312a-312c on the SCP communication system 312 may have been configured to receive) power via the Ethernet cable(s) connected to those port(s) 312a-312c. Thus, at block 414, the SCP subsystem 312 may be configured to determine when the power (or sufficient power) is no longer available from the power system 314 and, in response, draw power from the port(s) 312a-312c that is being provided by the networking device 204 via respective data/power cables. However, while a specific example of the configuration and provisioning of power to the SCP communication system 312 has been illustrated and described, one of skill in the art in possession of the present disclosure will recognize that the SCP communication system 308 may be receive power from the networking device 204 in a variety of manners while remaining within the scope of the present disclosure as well.

Figure 6B:
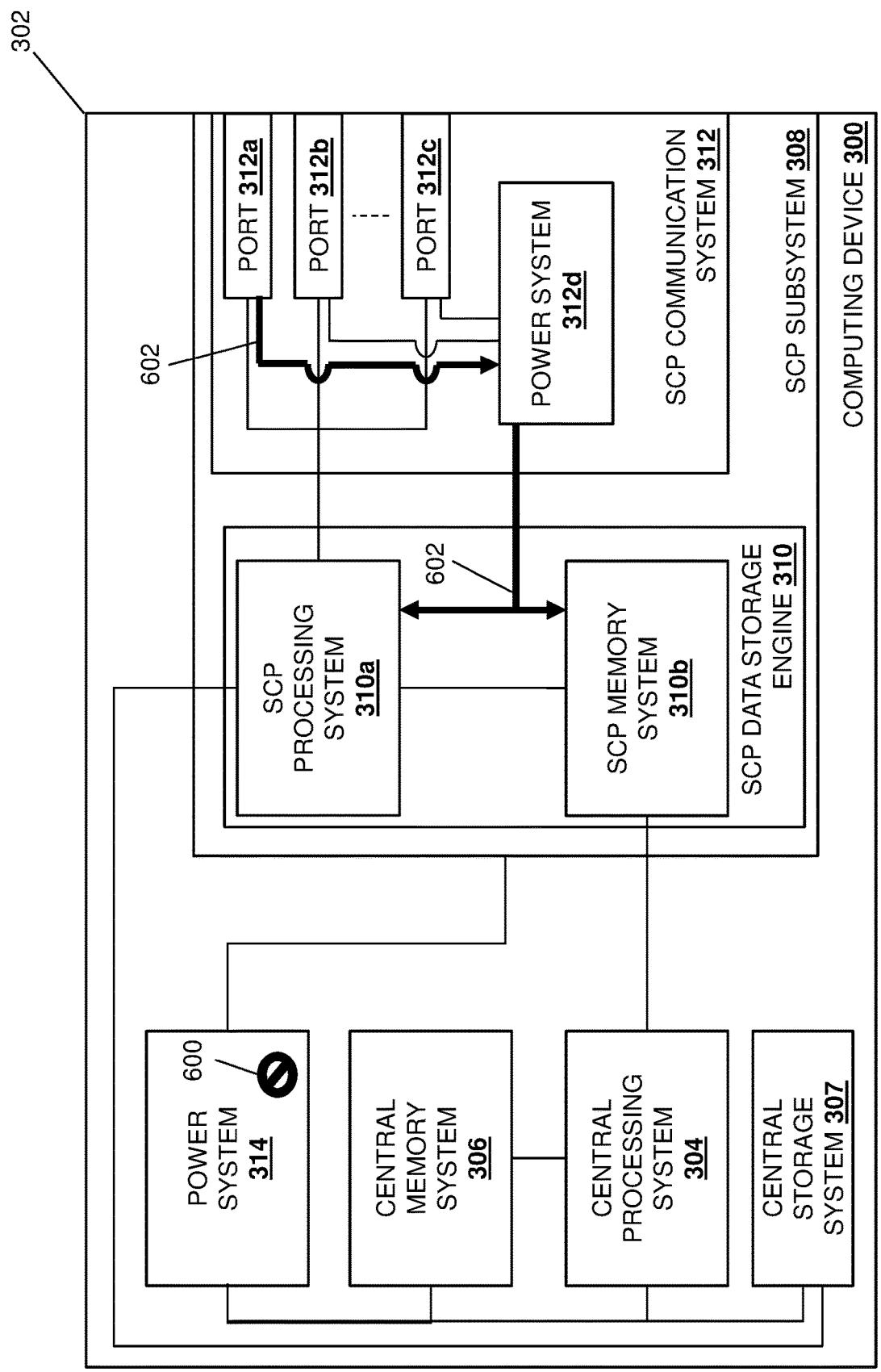
FIG. 6B is a schematic view illustrating an embodiment of the computing device of FIG. 3 operating during the method of FIG. 4.

As such, with reference to FIG. 6B, the SCP communication system 312 may perform power provisioning operations 602 that include providing power received via the port 312a to the power system 312 in the SCP communication system 312, with that power system 312 utilizing some of that power to power the SCP communication system 312, and providing at least some of that power to the SCP processing system 310a and the volatile SCP memory system 310b, as well as any other components in the SCP communication system 312 that one of skill in the art in possession of the present disclosure would recognize as being required to provide the data storage functionality discussed below. Similarly, with reference to FIG. 6C, the SCP communication system 312 may perform power provisioning operations 604 that include providing power received via the ports 312a-312c to the power system 312 in the SCP communication system 312, with that power system 312 utilizing some of that power to power the SCP communication system 312, and providing at least some of that power to the SCP processing system 310a and the volatile SCP memory system 310b, as well as any other components in the SCP communication system 312 that one of skill in the art in possession of the present disclosure would recognize as being required to provide the data storage functionality discussed below. As will be appreciated by one of skill in the art in possession of the present disclosure, while one or all of the ports 312a-312c on the SCP communication system 312 are illustrated and described as receiving power from the networking device 204, any subset of the ports 312a-312 on the SCP communication system 312 that are provided by data/power ports may receive power from the networking device 204 and provide that power to the power system 312d in the SCP communication system 312 while remaining within the scope of the present disclosure as well.

Figure 6C:
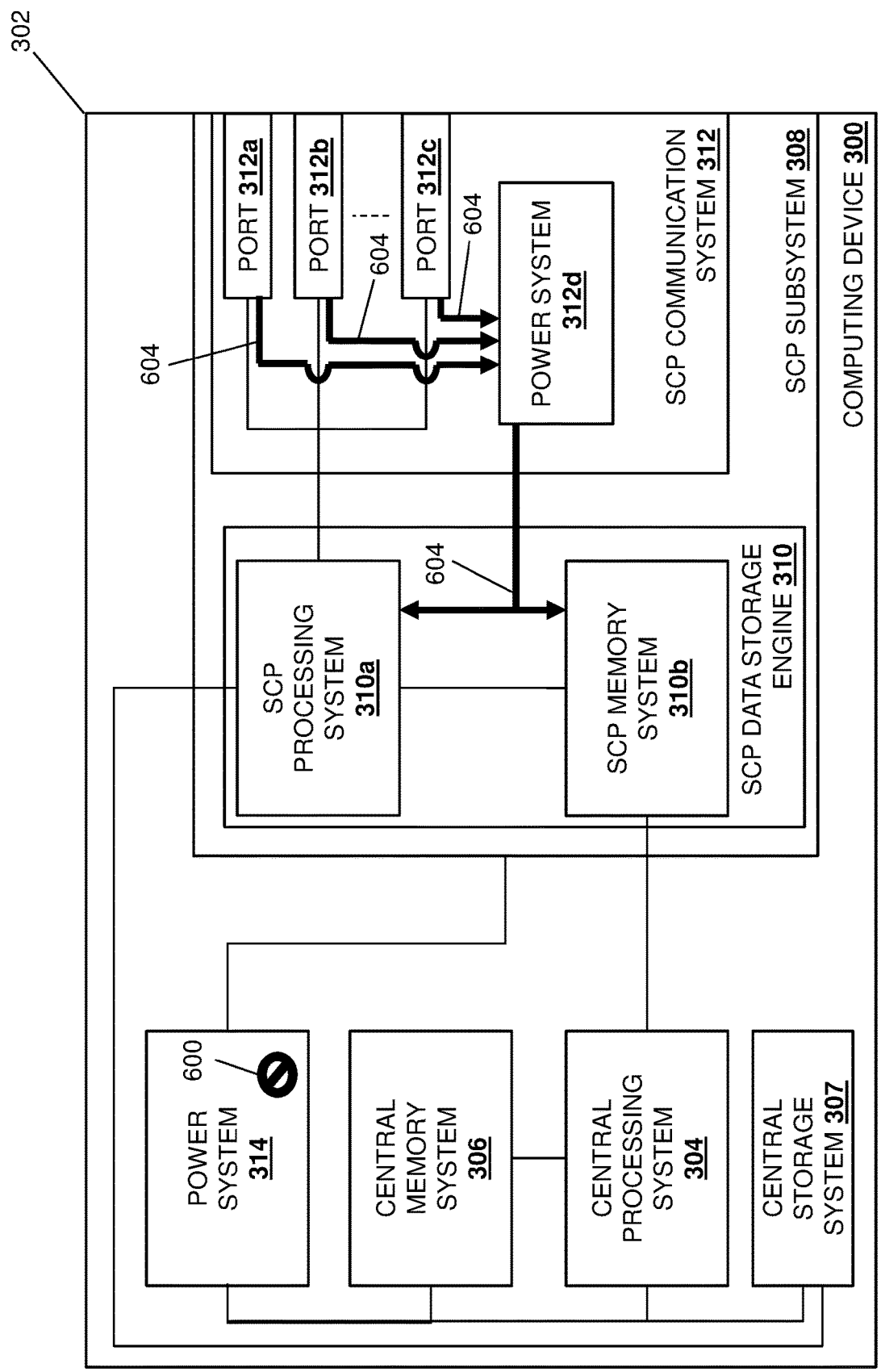
FIG. 6C is a schematic view illustrating an embodiment of the computing device of FIG. 3 operating during the method of FIG. 4.

As will be appreciated by one of skill in the art in possession of the present disclosure, FIGS. 6B and 6C illustrate power unavailability operations for the computing device 202/300 in which power has become unavailable from the power system 314, and thus the power provided by the networking device 204 to the SCP communication system 312 is utilized in order ensure that data stored in the volatile SCP memory system 310b (e.g., as part of block 406 of the method 400 discussed above) is not lost. Furthermore, FIGS. 6B and 6C illustrate how different power amounts may be available to the SCP communication system 312, and as discussed above the operations performed by the SCP subsystem 308 when power is unavailable from the power system 314 may be configured based on the amount of power available to the SCP communication system 312.

For example, with reference to the embodiment illustrated in FIG. 6B, when power will only be available to the SCP communication system 312 via a single port 312a (which may be determined during the PoE negotiation operations discussed above), the operations of the SCP subsystem 308 may be minimized in order to ensure that power is sufficient to complete the data storage operations described below. However, with reference to the embodiment illustrated in FIG. 6C, when power will be available to the SCP communication system 312 via each of the ports 312a-312c (which may be determined during the PoE negotiation operations discussed above), the operations of the SCP subsystem 308 may be maximized in order to complete the data storage operations described below as quickly as possible. As such, one of skill in the art in possession of the present disclosure will appreciate how the SCP communication system 312 may be configured in a variety of manners based on the amount of power that will be available to the SCP communication system 312 in the event power is unavailable from the power system 314.

Furthermore, as discussed above, the SCP processing system 310a (e.g., a microcontroller) may require relatively less power than the central processing system 304 (e.g., a CPU), and thus the power available from the SCP communication system 312 may be sufficient to operate that SCP processing system 310a as discussed below when it would not otherwise be sufficient to operate the central processing system 304 in the computing device 300. As such, PoE power to the SCP communication system 312 may provide an "uninterruptible power supply" input to the SCP subsystem 308 at a relatively lower power level than would be required to operate the entire computing device 300, and may use the existing data/power cables that are provided to connect the computing device 300 to the network 206.

Figure 6D:
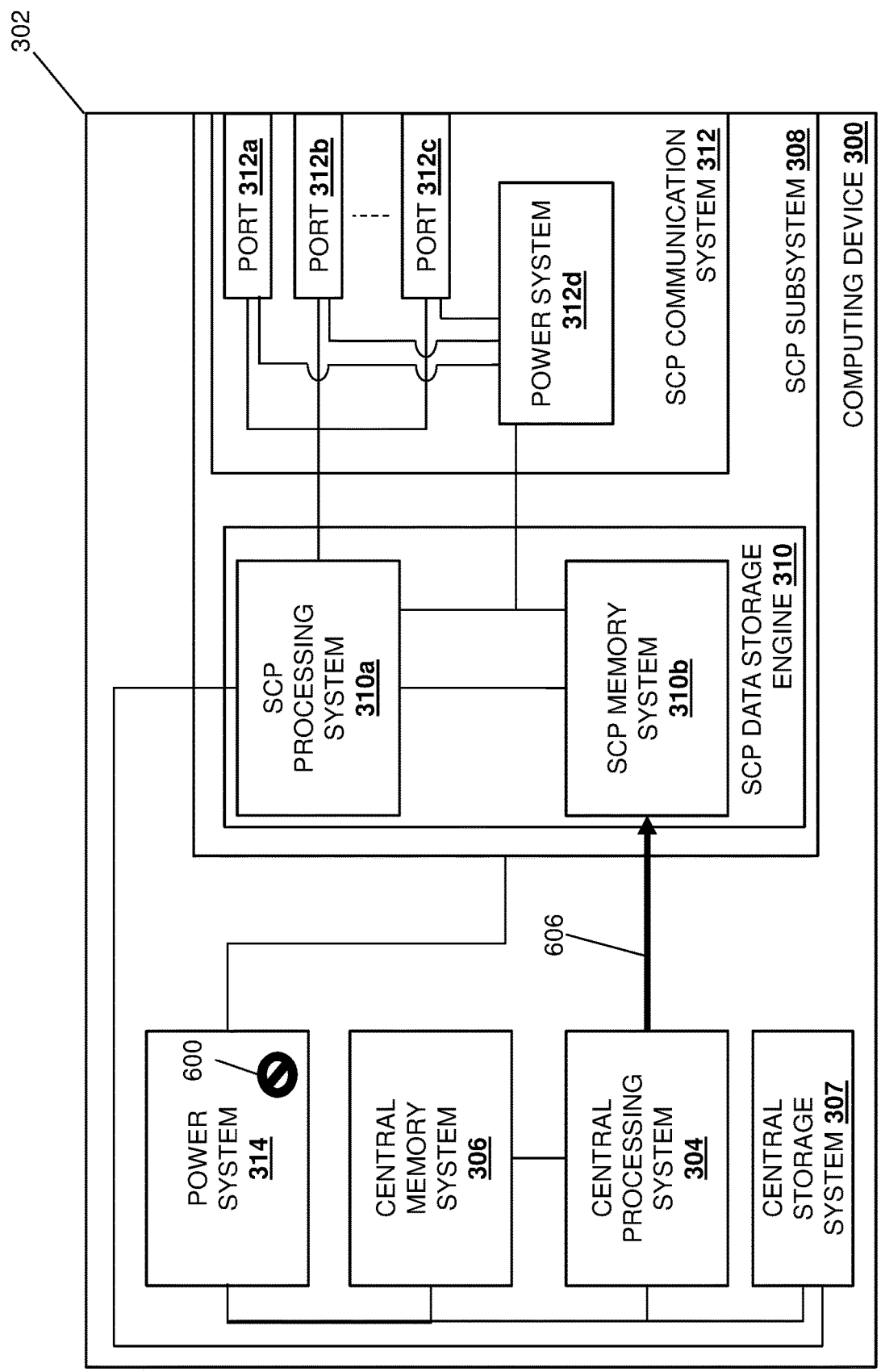
FIG. 6D is a schematic view illustrating an embodiment of the computing device of FIG. 3 operating during the method of FIG. 4.

The method 400 then proceeds to optional block 416 where the central processing system may store data in an SCP memory system. With reference to FIG. 6D, in an embodiment of optional block 416 and while power is being provided to the SCP subsystem 308 by the SCP communication system 312 as illustrated in FIG. 6B or 6C, the central processing system 304 in the computing device 202/300 may perform data storage operations 606 that include storing data in the volatile SCP memory system 310*b* included in the SCP subsystem 308. While illustrated as directly storing data in the volatile SCP memory system 310*b*, one of skill in the art in possession of the present disclosure will appreciate that the central processing system 304 in the computing device 202/300 may provide that data to the SCP processing system 310*a* for storage in the SCP memory system 310*b* at block 416 while remaining within the scope of the present disclosure as well. As discussed above, the central memory system 306 may include instructions that, when executed by the central processing system 304, cause the central processing system 304 to provide an operating system, applications, and/or any of a variety of other data generation subsystems that are configured to provide data for storage in the volatile SCP memory system 310*b* in the SCP subsystem 308 as part of the data storage operations 502. Furthermore, at optional block 416 and in response to power unavailability from the power system 314, the central processing system 304 may be configured to perform a "fast write" transaction to write any data that has not been written to the volatile SCP memory system 310*b* to that volatile SCP memory system 310*b*. In a specific example, the central processing system 304 may include a limited power source (e.g., a battery, capacitor, etc.) that provide a limited power amount that is sufficient to complete the fast write transaction discussed above. In another specific example, the central processing system 304 may be configured to detect an impending power unavailability from the power system 314 and, in response, complete the fast write transaction discussed above before losing power from the power system 314. However, while a few specific examples have been provided, one of skill in the art in possession of the present disclosure will appreciate how the central processing system 304 may perform the fast write transaction discussed above in association with the power unavailability from the power system 314 in a variety of manners that will fall within the scope of the present disclosure as well.

As such and similarly as described above, the data storage operations 606 may include the central processing system 304 in the computing device 202/300 storing the data in the volatile SCP memory system 310*b* (e.g., a RAM or other volatile memory system) or a volatile portion of the SCP memory system 310*b*. Thus, the data stored by the central processing system 304 in the computing device 202/300 as part of the data storage operations 502, and optionally the data stored by the processing system 304 in the computing device 202/300 as part of the data storage operations 606, may be stored in the volatile SCP memory system 310*a* while power is unavailable from the power system 314, and one of skill in the art in possession of the present disclosure will recognize that the power provided to the SCP subsystem 308 by the SCP communication system 312 as illustrated in FIG. 6B or 6C is utilized by the volatile SCP memory system 310*b* in order to maintain the storage of that data.

Figure 6E:
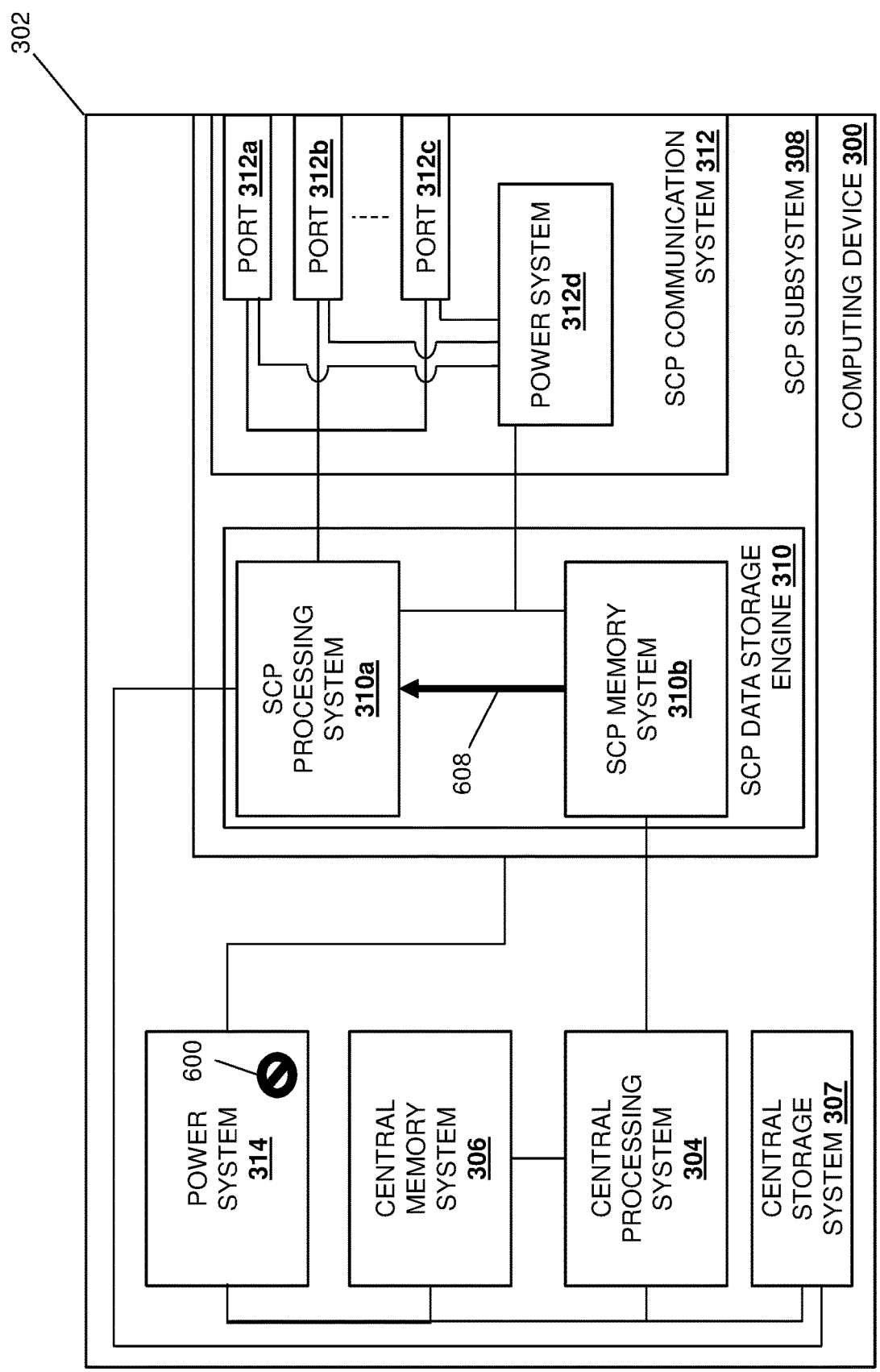
FIG. 6E is a schematic view illustrating an embodiment of the computing device of FIG. 3 operating during the method of FIG. 4.

The method 400 then proceeds to block 418 where the SCP data storage subsystem retrieves data stored in the SCP memory system. With reference to FIG. 6E, in an embodiment of block 408, the SCP processing system 310*a* providing the SCP data storage engine 310 in the computing device 202/300 may perform data retrieval operations 608 that include retrieving data stored in the volatile SCP memory system 310*b*. Thus, the SCP processing system 310*a* may perform the data retrieval operations 608 using power provided by the SCP communication system 312 as illustrated in FIG. 6B or 6C while power is unavailable from the power system 314, and one of skill in the art in possession of the present disclosure will recognize that the power provided to the SCP subsystem 308 by the SCP communication system 312 as illustrated in FIG. 6B or 6C is utilized by the volatile SCP memory system 310*b* in order to maintain the storage of that data.

Figure 6F:
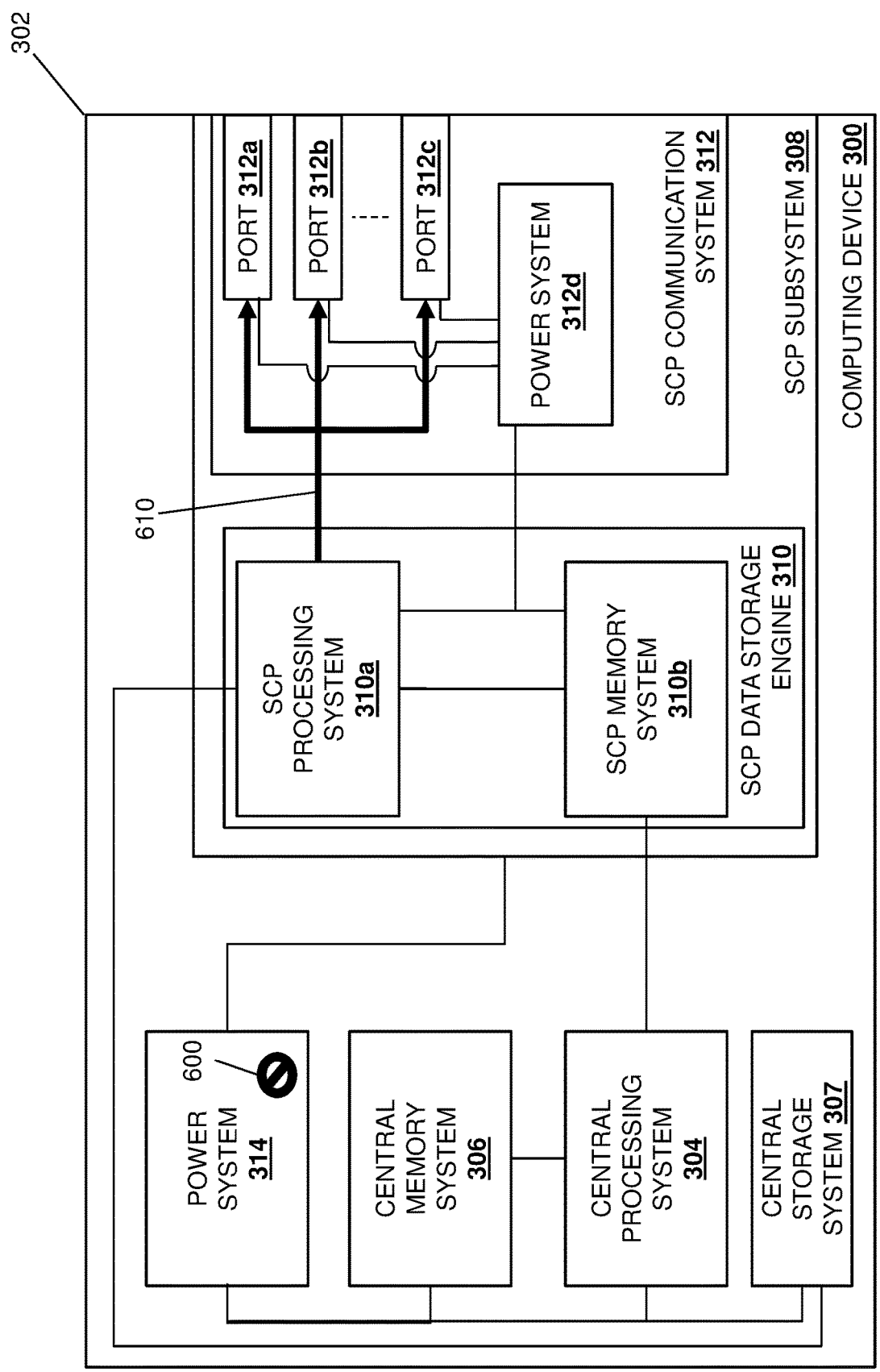
FIG. 6F is a schematic view illustrating an embodiment of the computing device of FIG. 3 operating during the method of FIG. 4.

The method 400 then proceeds to block 420 where the SCP data storage subsystem transmits the data via a network for storage in storage device(s). With reference to FIGS. 6F and 6G, in an embodiment of block 420, the SCP processing system 310*a* providing the SCP data storage engine 310 in the computing device 202/300 may perform data storage operations 610 that include transmitting the data retrieved from the SCP memory system 310*b* via one or more of the ports 312*a*-312*c*, through the networking device 204, via the network 206, and to one or more of the storage devices 208*a*-208*c*. Thus, while FIGS. 6F and 6G illustrate the data being transmitted via each of the ports 312*a*-312*c* and to each of the storage devices 208*a*-208*c* as part of the data storage operations 610, one of skill in the art in possession of the present disclosure will appreciate how data may be transmitted via a subset of the ports 312*a*-312*c* (e.g., a single port) and to a subset of the storage devices 208*a*-208*c* (e.g., a single storage device) while remaining within the scope of the present disclosure as well. As discussed above, the SCP processing system 310*a* may perform the data storage operations 610 using power provided by the SCP communication system 312 as illustrated in FIG. 6B or 6C while power is unavailable from the power system 314, and one of skill in the art in possession of the present disclosure will recognize that the power provided to the SCP subsystem 308 by the SCP communication system 312 as illustrated in FIG. 6B or 6C is utilized by the volatile SCP memory system 310*b* in order to maintain the storage of that data. In a specific example, the data storage operations 610 may include transmitting multiple copies of the data to two or more of the storage devices 208*a*-208*c* in order to provide redundant storage of that data in network-attached storage.

Figure 6H:
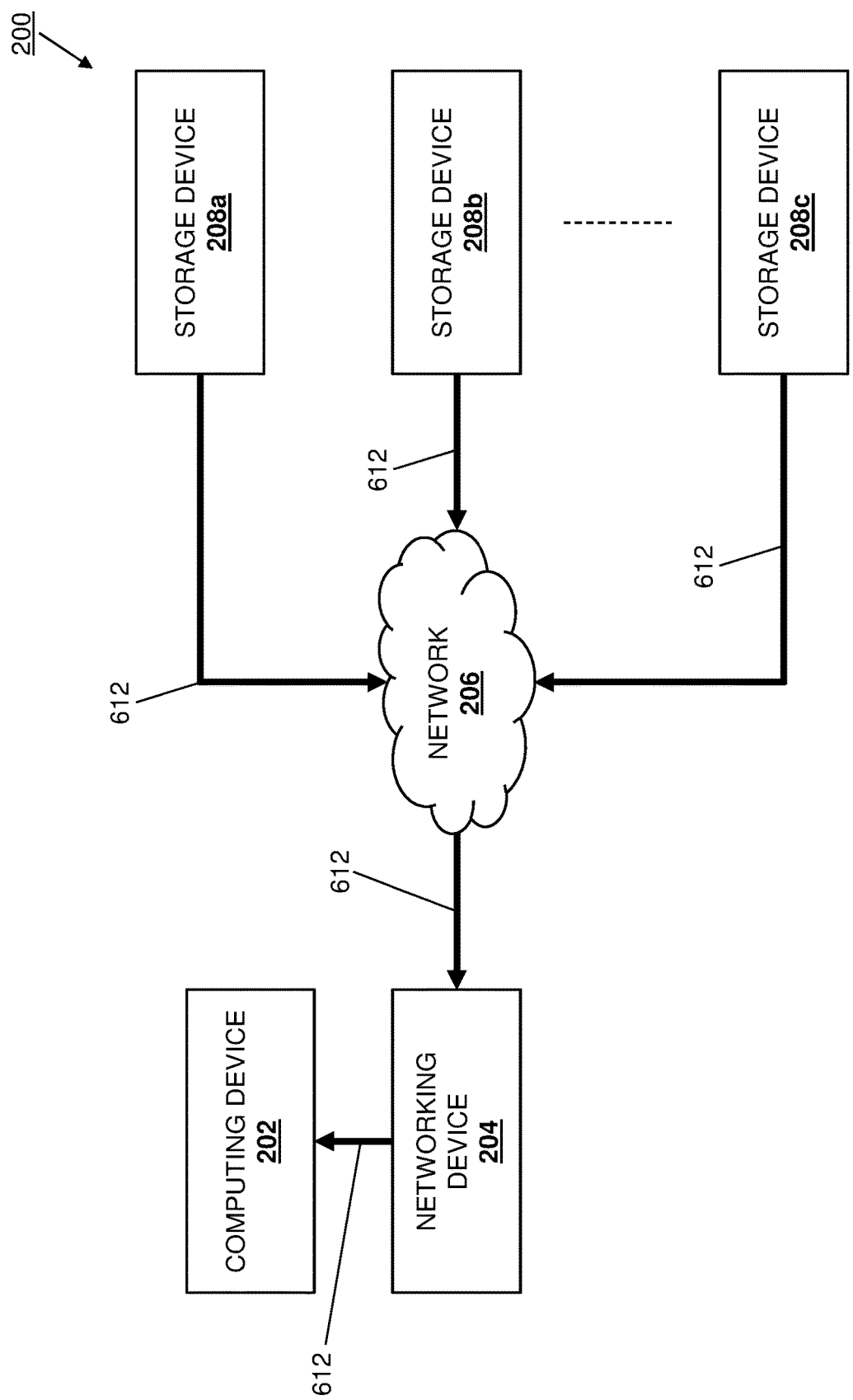
FIG. 6H is a schematic view illustrating an embodiment of the networked system of FIG. 2 operating during the method of FIG. 4.
Figure 6I:
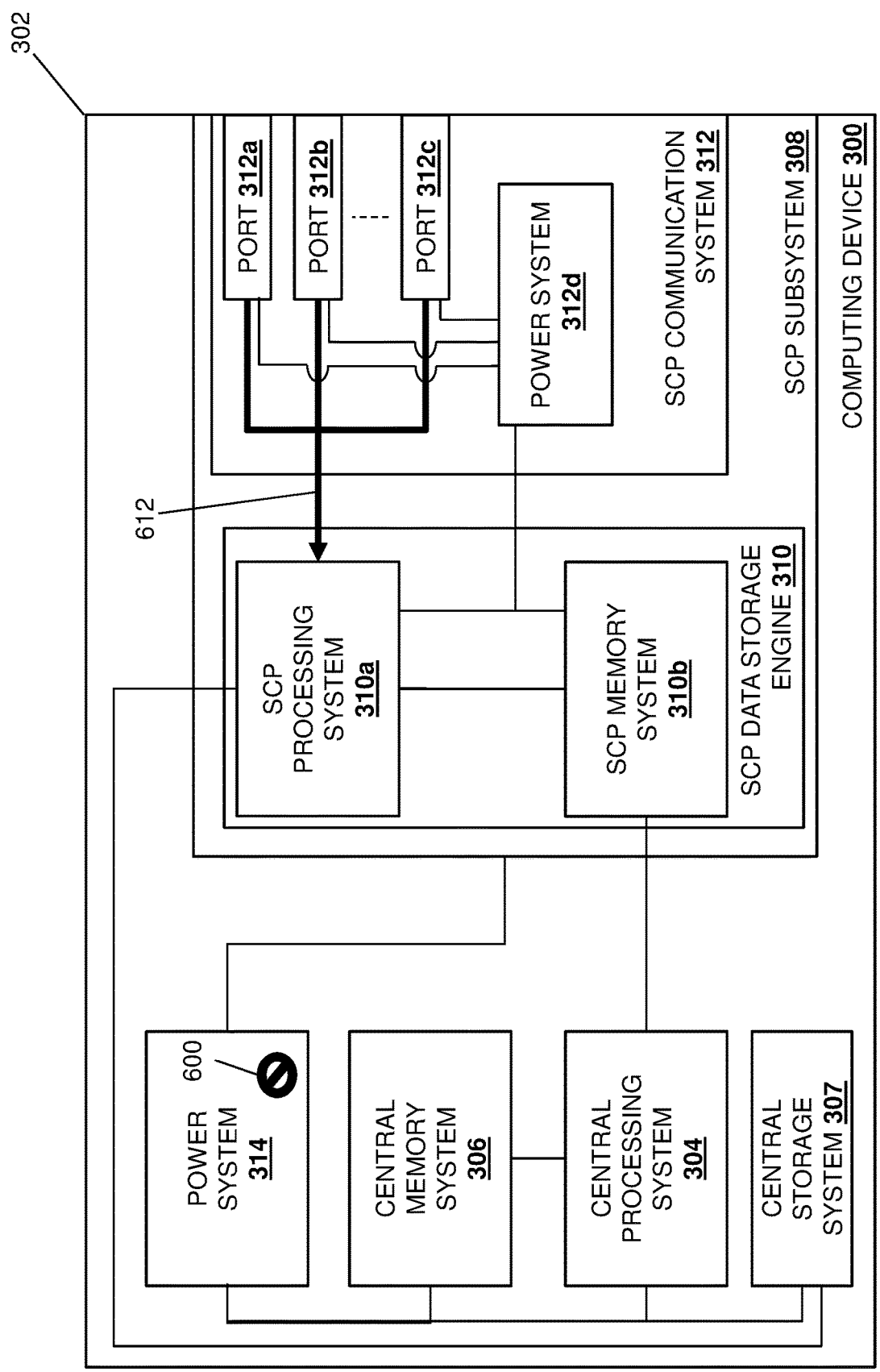
FIG. 6I is a schematic view illustrating an embodiment of the computing device of FIG. 3 operating during the method of FIG. 4.

The method 400 may then proceed to optional block 422 where the SCP data storage subsystem receives a data storage acknowledgement from the storage device(s) and removes the data from the SCP memory system. With reference to FIGS. 6H and 6I, in an embodiment of optional block 422 and in response to receiving the data as part of the data storage operations 610 and storing that data, one or more of the storage device(s) 208*a*-208*c* may perform data storage acknowledgement operations 612 that include generating a data storage acknowledgement and transmitting that data storage acknowledgement via the network 206, through the networking device 204, and to the computing device 202/300 such that the SCP processing system 310*a* providing the SCP data storage engine 310 receives the data storage acknowledgement via one or more of the ports 312*a*-312*c*. Thus, while FIGS. 6H and 6I illustrate the data storage acknowledgement being transmitted by each of the storage devices 208*a*-208*c* as part of the data storage acknowledgement operations 612 and received by the SCP processing system 310*a* via each of the ports 312*a*-312*c*, one of skill in the art in possession of the present disclosure will appreciate how data storage acknowledgements may be transmitted by a subset of the storage devices 208*a*-208*c* (e.g., a single storage device) and received by the SCP processing system 310*a* via a subset of the ports 312*a*-312*c* (e.g., a single port) while remaining within the scope of the present disclosure as well.

Figure 6J:
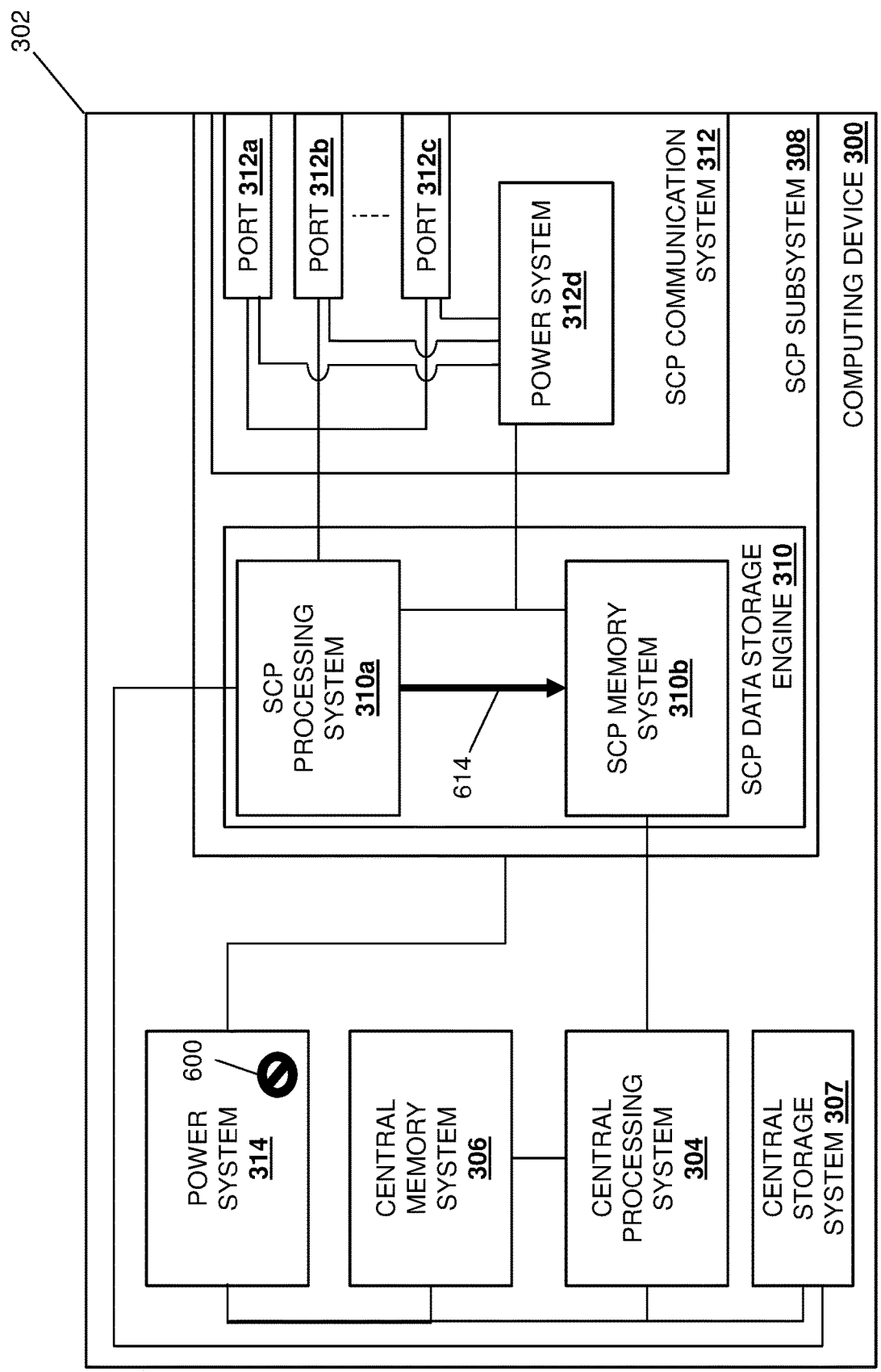
FIG. 6J is a schematic view illustrating an embodiment of the computing device of FIG. 3 operating during the method of FIG. 4.

With reference to FIG. 6J, in an embodiment of optional block 422 and in response to receiving the data storage acknowledgement from the storage device(s) 208a-208c, the SCP processing system 310a providing the SCP data storage engine 310 may perform data removal operations 614 that include removing the data from the volatile SCP memory system 310b. As will be appreciated by one of skill in the art in possession of the present disclosure, the data storage acknowledgment received from the storage device(s) 208a-208c verifies that the data transmitted as part of the data storage operations 610 has been persistently stored in the storage device(s) 208a-208c, and thus allows that data to be erased, deleted, and/or otherwise removed from the volatile SCP memory system 310b without any associated risk of loss of that data if power becomes unavailable to the volatile SCP memory system 310b. However, one of skill in the art in possession of the present disclosure will appreciate how data may be retained in the volatile SCP memory system 310b as long as no data storage acknowledgement has been received from the storage device(s) 208a-208c. As such, the data stored in the volatile SCP memory system 310b may be persistently stored in the storage device(s) 208a-208c in response to the power from the power system 314 becoming unavailable, ensuring that data is not lost in power unavailability situations like those discussed above.

Figure 6K:
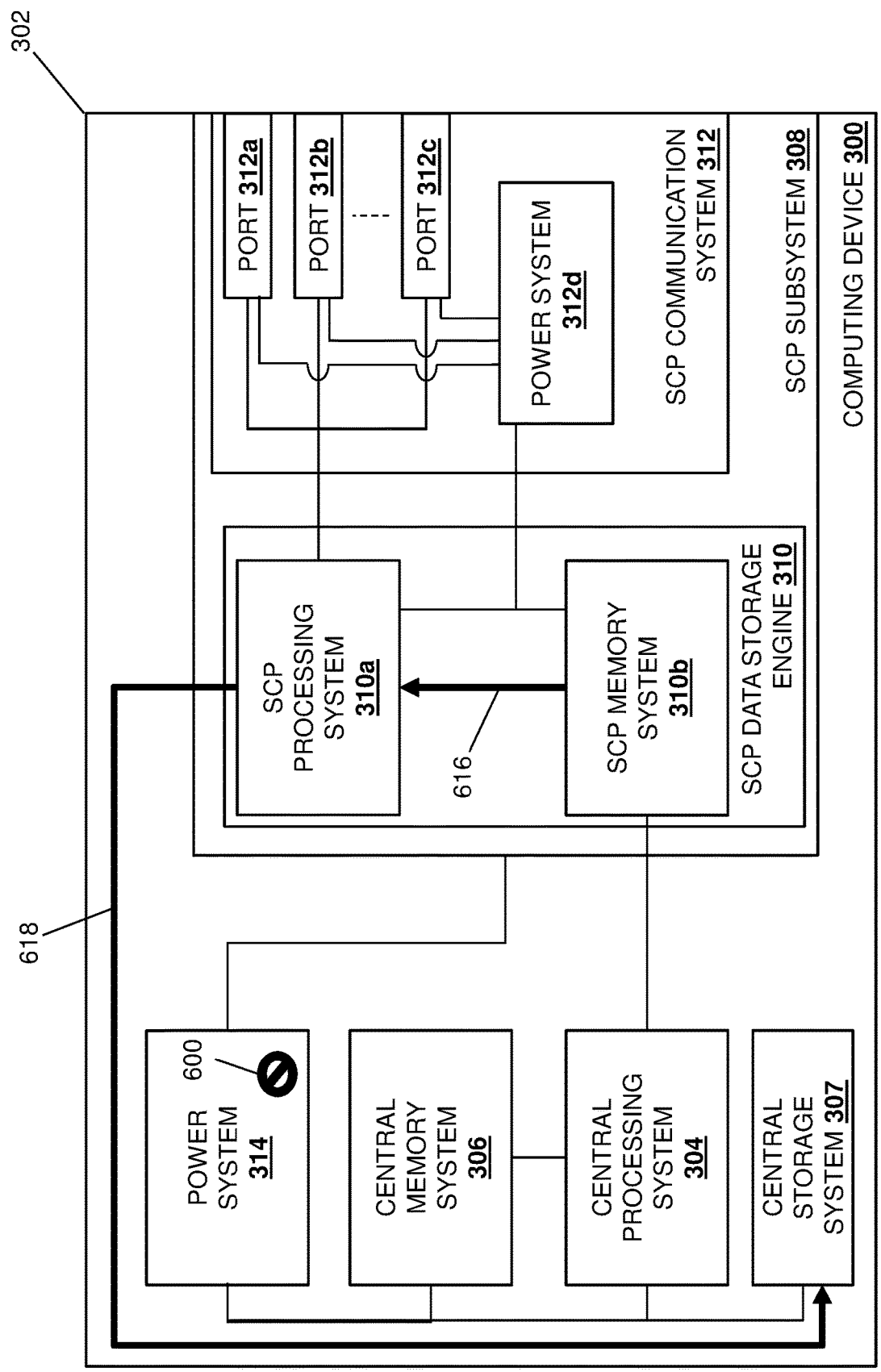
FIG. 6K is a schematic view illustrating an embodiment of the computing device of FIG. 3 operating during the method of FIG. 4.

As will be appreciated by one of skill in the art in possession of the present disclosure, the SCP data storage engine 310 may be configured to perform a variety of other functionality to enable the data storage functionality described above. For example, the SCP data storage engine 310 may be configured to transfer data stored in the volatile SCP memory system 310b via the network 206 and to the storage device(s) 208a-208c as discussed above, or to the central storage system 307, in the event of a power unavailability from the power system 314. With reference to FIG. 6K, in situations in which the SCP data storage engine 310 determines that data in the volatile SCP memory system 310b should be stored in the central storage system 307 in the event of a power unavailability from the power system 314, blocks 418 and 420 of the method 400 may be modified such that the SCP processing system 310a providing the SCP data storage engine 310 performs data retrieval operations 616 to retrieve data stored in the volatile SCP memory system 310b, and performs data storage operations 618 to store that data in the central storage system 307. As will be appreciated by one of skill in the art in possession of the present disclosure, the amount and configuration of the power available from the SCP communication system 312 in the event of a power unavailability from the power system 314 may enable the option to store data from the volatile SCP memory system 310b in the central storage system 307/local storage on the computing device 300 (e.g., due to battery power in the computing device being sufficient to enable such operations, due to the power available from the SCP communication system 312 being provided to the central storage system 307, etc.)

Furthermore, in some examples, the SCP data storage engine 310 may be configured to utilize power available from the networking device 204 via the SCP communication system 312 to charge a power storage system in the computing device 202/300 such as a battery, a capacitor, and/or other power storage systems known in the art. As will be appreciated by one of skill in the art in possession of the present disclosure, the charging of such a power storage system in the computing device 202/300 may allow for the powering of at least some components in the computing device 202/300 in the event power is unavailable from the power system 314, may provide extra power capacity for power spikes that may occur subsequent to power unavailability from the power system 314 and once power from the power system has been restored, and/or for a variety of other uses known in the art.

Thus, systems and methods have been described that provide an SCP subsystem in a server device that operates to receive data from the server device in a volatile SCP RAM and persistently store that data in one or more network-attached storage devices, and in the event of a power unavailability to the server device, will utilize power received via one or more Ethernet cables connected to its SCP communication system in order to ensure that the data stored in the volatile SCP RAM is persistently stored in the network-attached storage device(s). For example, the SCP power unavailability data storage system of the present disclosure may include a server device including a power system, a CPU, and an SCP subsystem that are coupled together. The SCP subsystem includes a volatile SCP RAM that stores data provided by the CPU, an SCP processing system coupled to the volatile SCP RAM, and an SCP communication system that, when power is unavailable from the power system, utilizes power received via its PoE port(s) and provides that power to the volatile SCP RAM and the SCP processing system. An SCP data storage engine provided by the SCP processing system will, in response to an unavailability of power from the power system, operate using power received via the PoE port(s), retrieve data stored in the volatile SCP RAM, and transmit the data via PoE port(s) on the SCP communication system and through a network for storage on storage device(s). As such, power-unavailability data backup is enabled without having to provide backup power for the entire server device by powering an SCP subsystem in the server device that utilizes a relatively low power amount available via existing Ethernet cabling to perform the data storage/backup, thus reducing the cost of such power-unavailability data backup systems relative to conventional systems Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A System Control Processor (SCP) power unavailability data storage system, comprising:
 a chassis;
 a power system that is located in the chassis;
 a central processing system that is coupled to the power system and that is located in the chassis; and
 a System Control Processor (SCP) subsystem that is located in the chassis and coupled to the central processing system and the power system, wherein the SCP subsystem includes:
  a volatile SCP memory system that is configured to store data provided by the central processing system;
  an SCP processing system that is coupled to the volatile SCP memory system; and
  an SCP communication system that includes a plurality of ports and that is configured, when power is unavailable from the power system, to utilize power received via at least one data/power port that is included in the plurality of ports and provide at least some of that power to the volatile SCP memory system and the SCP processing system, and wherein the SCP processing system is configured to execute instructions to provide an SCP data storage engine that is configured, in response to an unavailability of power from the power system, to:
operate using power received via the at least one data/power port that is included on the SCP communication system;
retrieve data stored in the volatile SCP memory system; and
transmit the data via at least one of the plurality of ports included on the SCP communication system and through a network for storage on at least one storage device.

2. The system of claim 1, wherein the volatile SCP memory system is configured, following the unavailability of power from the power system to:
receive the data from the central processing system.

3. The system of claim 1, wherein the SCP data storage engine is configured, following the unavailability of power from the power system, to:
transmit a respective copy of the data via at least one of the plurality of ports included on the SCP communication system and through the network for storage on at least two storage devices.

4. The system of claim 1, wherein the SCP data storage engine is configured, following the unavailability of power from the power system, to:
retain the data in the volatile SCP memory system as long as no data storage acknowledgement has been received from the at least one storage device.

5. The system of claim 1, wherein the SCP data storage engine is configured, following the unavailability of power from the power system, to:
receive a data storage acknowledgement from the at least one storage device; and
remove, in response to receiving the data storage acknowledgment from the at least one storage device, the data from the volatile SCP memory system.

6. The system of claim 1, further comprising:
a central storage system that is coupled to the SCP subsystem and that is located in the chassis, wherein the SCP data storage engine is configured to:
identify that power is available from the SCP communication system when power is unavailable from the power system and, in response, select the at least one storage device coupled to the at least one of the plurality of ports included on the SCP communication system and through the network for storage of the data over the central storage system.

7. An Information Handling System (IHS), comprising:
a System Control Processor (SCP) processing system;
an SCP memory system that is coupled to the SCP processing system and that includes instructions that, when executed by the SCP processing system, cause the SCP processing system to provide an SCP data storage engine; and
an SCP communication system that is coupled to the SCP processing system and the SCP memory system, wherein the SCP communication system is configured, when power is unavailable from a power system that is coupled to the SCP processing system, to utilize power received via at least one data/power port that is included in a plurality of ports on the SCP communication system, and provide at least some of that power to the SCP memory system and the SCP processing system, wherein the SCP data storage engine is configured, when the power is unavailable from the power system that is coupled to the SCP processing system, to:
operate using the at least some of the power provided by the SCP communication system to the SCP processing system and the SCP memory system;
retrieve data stored in a volatile portion of the SCP memory system; and
transmit the data via at least one of the plurality of ports included on the SCP communication system and through a network for storage on at least one storage device.

8. The IHS of claim 7, wherein the volatile portion of the SCP memory system is configured, following the unavailability of power from the power system to:
receive the data from a central processing system that is coupled to the SCP memory system.

9. The IHS of claim 7, wherein the SCP data storage engine is configured, following the unavailability of power from the power system, to:
transmit a respective copy of the data via at least one of the plurality of ports included on the SCP communication system and through the network for storage on at least two storage devices.

10. The IHS of claim 7, wherein the SCP data storage engine is configured, following the unavailability of power from the power system, to:
retain the data in the volatile portion of the SCP memory system as long as no data storage acknowledgement has been received from the at least one storage device.

11. The IHS of claim 7, wherein the SCP data storage engine is configured, following the unavailability of power from the power system, to:
receive a data storage acknowledgement from the at least one storage device; and
remove, in response to receiving the data storage acknowledgment from the at least one storage device, the data from the volatile portion of the SCP memory system.

12. The IHS of claim 7, wherein the SCP data storage engine is configured to:
identify that power is available from the SCP communication system when power is unavailable from the power system and, in response, select the at least one storage device coupled to the at least one of the plurality of ports included on the SCP communication system and through the network for storage of the data over a central storage system that is coupled to the SCP processing.

13. The IHS of claim 7, wherein the SCP data storage engine is configured to:
use the power received via at least one data/power port that is included in the plurality of ports on the SCP communication system to charge a battery system that is coupled to the SCP processing system.

14. A method for System Control Processor (SCP) data storage, comprising:
receiving, by an SCP communication system that is coupled to an SCP processing system and an SCP data storage subsystem when power is unavailable from a power system that is coupled to the SCP processing system and the SCP data storage subsystem, power via at least one data/power port that is included in a plurality of ports on the SCP communication system;
providing, by the SCP communication system when the power is unavailable from the power system that is coupled to the SCP processing system and the SCP data storage subsystem, at least some of the power received via the at least one data/power port to the SCP processing system and the SCP data storge subsystem;

operating, by an SCP data storage subsystem when the power is unavailable from the power system that is coupled to the SCP processing system and the SCP data storage subsystem, using the at least some of the power provided by the SCP communication system;

retrieving, by the SCP data storage subsystem when the power is unavailable from the power system that is coupled to the SCP processing system and the SCP data storage subsystem, data stored in a volatile SCP memory system that is coupled to the SCP data storage subsystem; and transmitting, by the SCP data storage subsystem when the power is unavailable from the power system that is coupled to the SCP processing system and the SCP data storage subsystem, the data via at least one of the plurality of ports included on the SCP communication system and through a network for storage on at least one storage device.

15. The method of claim 14, further comprising:
receiving, by the volatile SCP memory system when power is unavailable from the power system that is coupled to the SCP data storage subsystem, the data from a central processing system that is coupled to the volatile SCP memory system.

16. The method of claim 14, further comprising:
transmitting, by the SCP data storage subsystem when power is unavailable from the power system that is coupled to the SCP data storage subsystem, a respective copy of the data via at least one of the plurality of ports included on the SCP communication system and through the network for storage on at least two storage devices.

17. The method of claim 14, further comprising:
retaining, by the SCP data storage subsystem when power is unavailable from the power system that is coupled to the SCP data storage subsystem, the data in the volatile portion of the SCP memory system as long as no data storage acknowledgement has been received from the at least one storage device.

18. The method of claim 14, further comprising:
receiving, by the SCP data storage subsystem when power is unavailable from the power system that is coupled to the SCP data storage subsystem, a data storage acknowledgement from the at least one storage device; and removing, by the SCP data storage subsystem when power is unavailable from the power system that is coupled to the SCP data storage subsystem and in response to receiving the data storage acknowledgment from the at least one storage device, the data from the volatile portion of the SCP memory system.

19. The method of claim 14, further comprising:
identifying, by the SCP data storage subsystem, that power is available from the SCP communication system when power is unavailable from the power system and, in response, select the at least one storage device coupled to the at least one of the plurality of ports included on the SCP communication system and through the network for storage of the data over a central storage system that is coupled to the SCP processing.

20. The method of claim 14, further comprising:
using, by the SCP data storage subsystem when power is unavailable from the power system that is coupled to the SCP data storage subsystem, the power received via at least one data/power port that is included in the plurality of ports on the SCP communication system to charge a battery system that is coupled to the SCP processing system.

* * * * *